United States Patent
Reynar et al.

(10) Patent No.: US 9,633,122 B2
(45) Date of Patent: Apr. 25, 2017

(54) SYSTEMS AND METHODS FOR WEB SITE CUSTOMIZATION BASED ON TIME-OF-DAY

(75) Inventors: Jeffrey C. Reynar, New York, NY (US); Robert Sewell, Ruther Glen, VA (US); Jason M. Watson, Seattle, WA (US)

(73) Assignee: AOL Inc., Dulles, VA (US)

( * ) Notice: Subject to any disclaimer, the term of this patent is extended or adjusted under 35 U.S.C. 154(b) by 538 days.

(21) Appl. No.: 13/277,664

(22) Filed: Oct. 20, 2011

(65) Prior Publication Data
US 2013/0104026 A1    Apr. 25, 2013

(51) Int. Cl.
*G06F 17/00*    (2006.01)
*G06F 17/30*    (2006.01)
*H04L 29/08*    (2006.01)
*G06Q 30/02*    (2012.01)

(52) U.S. Cl.
CPC .... *G06F 17/3087* (2013.01); *G06F 17/30241* (2013.01); *G06Q 30/02* (2013.01); *H04L 67/18* (2013.01)

(58) Field of Classification Search
CPC .......... G06Q 30/0261; G06Q 30/0269; G06Q 30/0241; G06Q 30/0271; H04L 67/18; G06F 17/30241; G06F 17/3087
USPC ........................................................ 715/234
See application file for complete search history.

(56) References Cited

U.S. PATENT DOCUMENTS

| | | | | |
|---|---|---|---|---|
| 7,089,264 B1 * | 8/2006 | Guido | ................ | G06Q 30/0241 |
| 8,131,754 B1 * | 3/2012 | Lawrence | ......... | G06F 17/30864 |
| | | | | 707/758 |
| 2004/0139049 A1 * | 7/2004 | Hancock | ................ | G01C 21/20 |
| 2005/0076014 A1 * | 4/2005 | Agarwal | ................ | G06Q 30/02 |
| 2006/0106944 A1 * | 5/2006 | Shahine | ............... | G06Q 20/382 |
| | | | | 709/245 |
| 2006/0181631 A1 * | 8/2006 | Suzuki | ................. | G11B 19/025 |
| | | | | 348/333.02 |
| 2007/0100688 A1 * | 5/2007 | Book | ..................... | G06Q 30/02 |
| | | | | 705/14.52 |
| 2008/0133336 A1 * | 6/2008 | Altman | .............. | G06Q 30/0207 |
| | | | | 455/456.1 |

(Continued)

OTHER PUBLICATIONS

Extended European Search Report mailed by the European Patent Office on Feb. 11, 2013, in European Application No. 12007218.6 (6 pages).

(Continued)

*Primary Examiner* — Scott Baderman
*Assistant Examiner* — Benjamin J Smith
(74) *Attorney, Agent, or Firm* — Finnegan, Henderson, Farabow, Garrett & Dunner, LLP

(57) ABSTRACT

Systems and methods are provided for delivering customized versions of web pages to users. In one implementation, a method is provided for customizing a delivered version of a web page to reflect a current time-of-day at a geographic location of the user. According to the method, a request for a web page is received from a client device of the user. The request for the web page includes an IP address of the client device. Based on the IP address, a current time is determined for the received request. Thereafter, a version of the requested web page corresponding to the current time is generated, and the generated version of the requested web page is delivered to the client device.

25 Claims, 11 Drawing Sheets

(56) References Cited

U.S. PATENT DOCUMENTS

| | | | |
|---|---|---|---|
| 2009/0077100 A1* | 3/2009 | Hancock et al. | 707/10 |
| 2009/0094213 A1* | 4/2009 | Wang | G06F 17/30867 |
| 2010/0075648 A1* | 3/2010 | Matsuoka | H04M 1/72566 |
| | | | 455/418 |
| 2010/0076967 A1* | 3/2010 | Canora | G06F 17/30041 |
| | | | 707/732 |
| 2011/0035284 A1* | 2/2011 | Moshfeghi | G06Q 30/02 |
| | | | 705/14.58 |
| 2011/0126155 A1* | 5/2011 | Krishnaraj | G06F 3/016 |
| | | | 715/811 |
| 2011/0137907 A1* | 6/2011 | Ikenoue | G06F 17/30241 |
| | | | 707/740 |
| 2011/0184793 A1* | 7/2011 | Bohannon | G06Q 10/107 |
| | | | 705/14.14 |
| 2011/0252064 A1* | 10/2011 | Murugappan | G06F 17/30041 |
| | | | 707/780 |
| 2011/0282700 A1* | 11/2011 | Cockcroft | G06Q 30/06 |
| | | | 705/5 |
| 2012/0064891 A1* | 3/2012 | Wijayanathan | H04W 4/021 |
| | | | 455/435.1 |
| 2012/0066066 A1* | 3/2012 | Jain | G06Q 30/0261 |
| | | | 705/14.58 |
| 2012/0109944 A1* | 5/2012 | Hao | G06F 17/30867 |
| | | | 707/723 |
| 2013/0034221 A1* | 2/2013 | Aaron | H04M 1/72519 |
| | | | 379/157 |
| 2013/0125031 A1* | 5/2013 | Calica | G06F 3/0484 |
| | | | 715/764 |

OTHER PUBLICATIONS

Lixǎndrolu, R., "Customizing Web Advertisements Based on Internet Users' Location," 11$^{th}$ WSEAS International Conference on Mathematics and Computers in Biology and Chemistry, Jun. 13, 2010. pp. 273-278.

Wang at al., "Towards Street-Level Client-Independent IP Geolocation", Proceedings of the 8$^{th}$ USENIX Symposium on Networked Systems Design and Implementation. Mar. 30, 2011, pp. 1-14.

* cited by examiner

SYSTEMS AND METHODS FOR WEB SITE CUSTOMIZATION BASED ON TIME-OF-DAY

BACKGROUND

Technical Field

The present disclosure generally relates to techniques for providing customized electronic content to a user based on, for example, a time-of-day in a geographic region. In particular, and without limitation, the present disclosure relates to systems and methods for providing electronic content, such as a web page, that is customized to reflect a content preference of a user at a specific time-of-day.

Background Information

Today, the Internet represents a vital information resource for both the sophisticated user and the novice. The popularity of the Internet as an information source is due, in part, to the vast amount of information available and to the relative ease with which that information may be accessed. However, the enormity of the information available to user does not alone address the dynamically-evolving needs and interests of users of the Internet.

Many web sites, and in particular, those associated with online news organizations and content providers, provide links to popular content that may be relevant to a user. For example, a web site of a news organization may recommend links to stories, images, and videos that are popular with users who have viewed the organization's web site. However, while these recommended links may provide a global or general indication of popularity, they provide no mechanism to address the time-specific demands for electronic content expressed by users of these web sites.

Web sites may also leverage a registration process to provide location-specific content to users. For example, a registered user of a web site in Washington, D.C. may receive, upon request, a "local" version of web page of a Washington, D.C. web page, but not a "national" version of the web page. Further, for example, the registered user may also express specific preferences for content to be delivered within a personalized version of the web page. However, while providing location-specific and user-specific content, such registration-based delivery processes may fail to dynamically adjust the presentation of content to the user in sequence with, for example, evolving, time-dependent needs and/or interests of the users.

In view of the foregoing, there is a need for improved systems and methods for automatically generating a customized version of a web page for a user. There is also a need for improved systems and methods for providing customized content for a user based on, for example, a current time of day associated with a geographic region, and/or preferences for specific types and formats expressed by the user. Such systems and methods may be implemented in computer-based environments, such as the Internet and network environments that provide online content to users.

SUMMARY

Consistent with embodiments of the present disclosure, computer-implemented systems and methods are provided for generating and delivering content to users, including customized content associated with a web page. In one exemplary embodiment, a method is provided that receives a request for a web page from a client device. The request includes an identifier of the client device. The method determines a current time associated with the received request, based on at least the identifier of the client device, and generates a version of the requested web page that corresponds to the current time. The generated version of the requested web page is transmitted to the client device.

Consistent with further embodiments of the present disclosure, an apparatus is provided having a storage device and at least one processor coupled to the storage device. The storage device stores a set of instructions executable by the at least one processor to cause the processor to receive a request for a web page from a client device. The request includes an identifier of the client device. The processor is further configured by the instructions to determine a current time associated with the received request, based on at least the identifier of the client device, and to generate a version of the requested web page that corresponds to the current time. The processor is further configured by the instructions to transmit the generated version of the requested web page to the client device.

Other embodiments of the present disclosure relate to a tangible computer-readable medium with stored instructions that, when executed by a processor, perform a method for delivering content to users. The method receives a request for a web page from a client device. The request includes an identifier of the client device. The method determines a current time associated with the received request, based on at least the identifier of the client device, and generates a version of the requested web page that corresponds to the current time. The generated version of the requested web page is transmitted to the client device.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

DETAILED DESCRIPTION

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
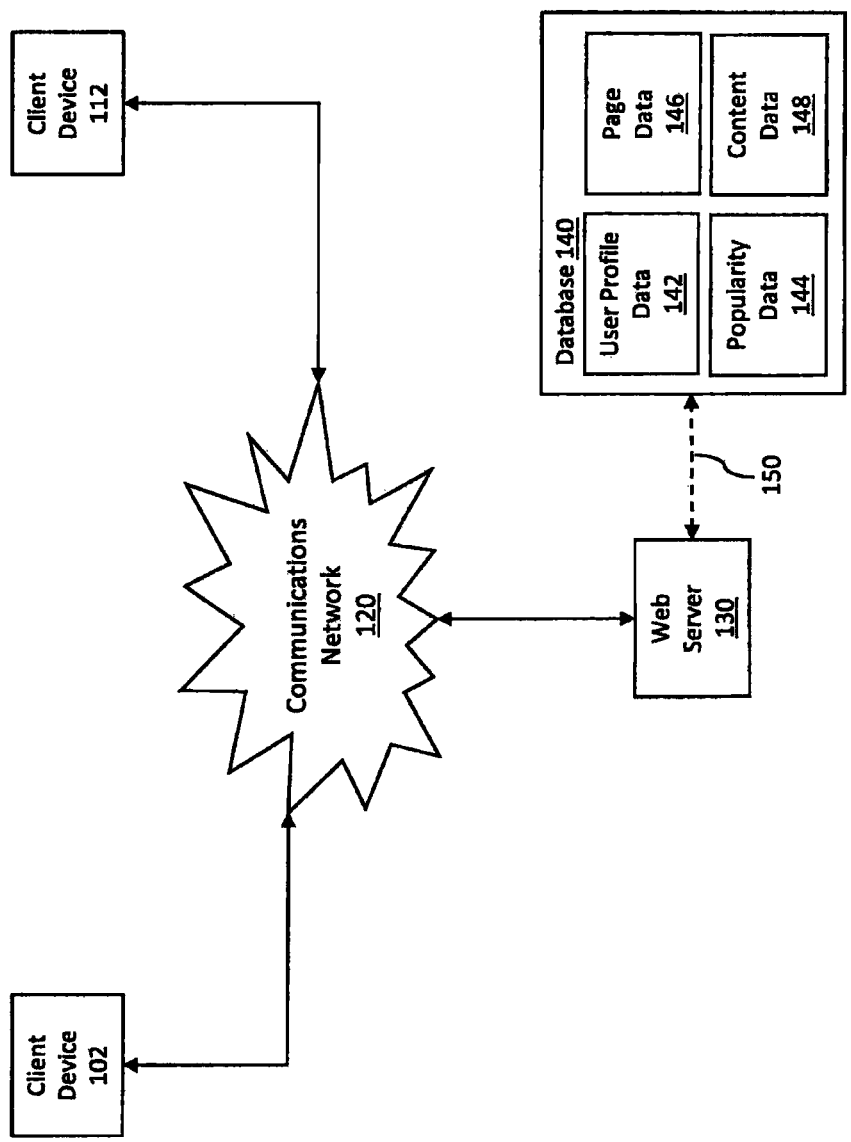
FIG. 1 is a diagram of an exemplary computing environment within which embodiments of the present disclosure may be practiced.

FIG. 1 illustrates an exemplary computing environment 100 within which embodiments of the present disclosure may be practiced. In FIG. 1, a web server 130 and a plurality of client devices, including client devices 102 and 112, are interconnected via a communications network 120. In an embodiment, client devices 102 and 112 can include, but are not limited to, a personal computer, a laptop computer, a notebook computer, a hand-held computer, a personal digital assistant, a portable navigation device, a mobile phone, a smart phone, or any additional or alternate computing device operable to transmit and receive data across network 120.

Although the exemplary embodiment of FIG. 1 illustrates computing environment 100 with client devices 102 and 112 in communication with web server 130, persons of ordinary skill in the art will recognize that computing environment 100 may include any number of additional mobile or stationary client devices, and any number of additional web servers without departing from the spirit or scope of the present disclosure. Furthermore, although computing environment 100 of FIG. 1 is illustrated with a single web server 130, web server 130 may be implemented as a system comprising a plurality of servers or a server farm, and computing environment 100 can include any number of web servers in communication with one another without departing from the spirit or scope of the present disclosure.

Communications network 120 may represent any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow mobile devices to send and receive data via applicable communications protocols, including those described above.

Referring back to FIG. 1, computing environment 100 also includes a database 140 in communications with web server 130. By way of example, web server 130 and database 140 may be incorporated into a single hardware unit, such as a single computer or server system. In such an embodiment, database 140 may be incorporated into, or stored within, a storage medium or storage device of web server 130, as described in FIG. 3, for example.

However, web server 130 and database 140 are not limited to such configurations, and, in additional embodiments, database 140 may reside on any additional or alternate computer or server accessible to web server 130 without departing from the spirit of scope of the present invention. For example, web server 130 and database 140 may form individual hardware components of a private network associated with web server 130, and may be in communications across wired or wireless link 150. Alternatively, database 140 may be associated with a separate hardware component, e.g., a server, capable of communication with web server 130 across communications network 120 using any of the communications protocols outlined above.

In the exemplary embodiment of FIG. 1, database 140 includes profile data 142, popularity data 144, page data 146, and content data 148. In an embodiment, user profile data 142 may include a plurality of profile data records that identify individual users of client devices within computing environment 100. For example, each profile data record of profile data 142 may be associated with a user of a client device, e.g., client device 102, and may specify an identifier of the user (e.g., a user name or login information) and a identifier of client device 102 (e.g., an internet-protocol (IP) address).

In an embodiment, a profile data record associated with a user may identify one or more demographic parameters that characterize the user. For example, the data record associated with a particular user may specify an age group associated with the user, a marital status of the user, a profession in which the user engages, a geographic location of the user, and/or any additional or alternate demographic parameter or characteristic.

Additionally or alternatively, the profile data record may specify one or more content-based preferences of the user. Such content-based preferences may include, but are not limited to, specific classes of electronic content or specific classes of activities preferred by the user at various times throughout the day. For example, the data record may indicate that the user desires to view electronic content related to breaking local news during a morning commute, and electronic content related to sports and celebrity gossip during an evening commute. Further, for example, the data record of the user may indicate that the user prefers to read news in the morning, and participate in social networking during a lunch hour.

In addition, the profile data record may also specify one or more editorial, contextual, and structural preferences of the user. For example, the editorial preferences include, but are not limited to, an interest in a specific author (or artist) or an interest in a specific group of authors (or artists). Contextual preferences may be specified in the profile based on, for example, keywords that are descriptive of content of interest to the user. Further, for example, the structural information may include, but is not limited to, a position of content within a displayed web page (e.g., a headline slot) and a position of content within a specific section of a web page (e.g., a first slot within the sports section of a news provider).

Further, the profile data record associated with the user may include information that identifies one or more social networking websites (e.g., Facebook, LinkedIn, and MySpace), micro-blogging applications (e.g., Twitter), or instant messaging applications (e.g., AOL Instant Messenger (IM)) associated with the user. In such an embodiment, the profile data record for the user may specify the particular website or application, and a login credential that enables the user to access the website or application.

In an embodiment, the user may be registered with web server 130, and the corresponding profile data record may be generated by web server 130 subsequent to a successful registration process. For example, in response to a request for electronic content, web server 130 may prompt the user to specify a login credential and various elements of profile information (e.g., demographic information, content-based preferences, and information related to social networking or micro-blogging applications). Upon entry of the login credential and profile information, web server 130 may generate a profile data record corresponding to the user, and store the generated data record in user profile data 142.

However, web server 130 is not limited to such exemplary mechanisms for generating profile data. In additional embodiments, profile data for a particular user may be generated or modified through an analysis of electronic content previously accessed by the user, and additionally or alternatively, through an analysis of electronic content accessed by segments of users that are similar to the particular user, e.g., that are disposed within a common geographic area or having other common characteristic(s). In such an embodiment, the analysis of the content accessed by the particular user, or by similar users, may leverage popularity data and corresponding metadata (e.g., popularity data 144 of FIG. 1 and metadata 240 of FIG. 2B) that describes electronic content and advertisements regularly accessed by users of web service 130, or alternatively, using any additional or alternate source of popularity data.

Referring back to FIG. 1, database 140 also includes popularity data 144. In an embodiment, popularity data 144 includes data records that indicate a popularity of electronic content including, e.g., web sites or pages, accessed by users of web server 130 across one or more regions during corresponding time intervals. For example, a data record in popularity data 144 may be associated with a unique user and/or web page, and may indicate a number of times a user has accessed the web page during a specific portion of a twenty-four hour day, i.e., a temporal unit, as further described below with reference to FIG. 2A.

Figure 2A:
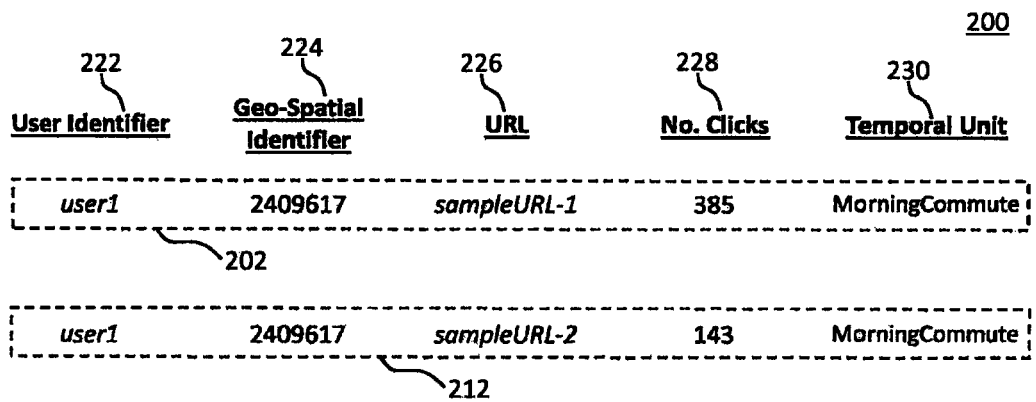
FIGS. 2A and 2B are diagrams of exemplary data structures, consistent with embodiments of the present disclosure.

FIG. 2A illustrates exemplary set of data records 200 that may be included within popularity data 144, consistent with disclosed embodiments. In the exemplary embodiment of FIG. 2A, records 200 include individual data records 202 and 212. However, records 200 are not limited to data records 202 and 212, and in additional embodiments, records 200 may include any number of data records without departing from the spirit or scope of the present disclosure.

In FIG. 2A, data records 202 and 212 respectively include a user identifier 222, a geo-spatial identifier 224, a Uniform Resource Locator (URL) 226 of a corresponding web page, popularity indicia 228, and a temporal unit 230. In an embodiment, user identifier 222 may include a unique, alpha-numeric identifier of the user (e.g., "user1"). However, data records 202 and 212 are not limited to such exemplary user identifiers, and in additional embodiments, user identifier 222 may include any additional or alternate alpha-numeric identifier, including, but not limited to, a login credential associated with the user, an email address associated with the user, an IP address associated with the device of the user (e.g., client devices 102 and 112 of FIG. 1), and/or any additional or alternate identifier.

In an embodiment, geographic identifier 224 may identify a particular geographic region that includes a client device of the user. By way of example, geographic identifier 224 may include a unique, numerical geo-spatial identifier of the region, including, but not limited to, a Where On Earth ID (WOEID) assigned to the region by the Yahoo! Developer Network, for example. In an embodiment, the assignment of a WOEID to the region may link the region to a corresponding set of geo-spatial coordinates associated with a centroid of the region (e.g., longitude, latitude, and altitude), and additionally or alternatively, data indicative of a parent-child relationship between the region and one or more additional regions, within a corresponding geo-spatial database.

Popularity indicia 228 may indicate a number of requests for web page 226 made by the user associated with user identifier 222. For example, the number of requests may reflect a number of times that web page 226 was requested by the user within the region. In an embodiment, the number of requests may reflect a summation of click events (e.g., when a user clicks on a URL rendered as a link by an application) and load events (e.g., when a user types a URL into an address window of an application browser). However, popularity indicia 228 are not limited to the number of requests for web page 226 within the corresponding region, and in additional embodiments, popularity indicia 228 may include any additional or alternate indicia of popularity apparent to a person of skill in the art and appropriate to the web site, without departing from the spirit or scope of the disclosed embodiments.

Temporal unit 230 may reflect a specific portion of a twenty-four hour day during which web page 226 was requested by user 222 within geographic region 224. For example, the twenty-four-hour day may be segmented into individual temporal unit that include, but are not limited to, portions of the day associated with morning, mid-day, afternoon, evening, and overnight. However, temporal unit 230 need not be limited to such a coarse segmentation, and in additional embodiments, the twenty-four-hour day may be finely segmented into to temporal units corresponding to fifteen-minute intervals, thirty-minute intervals, sixty-minute intervals, or any additional or alternate temporal unit apparent to one of skill in the art By way of example, records 202 and 212 may be associated with a user having a user identifier of "user1" and a geographic region having a geo-spatial identifier of "2409617," which corresponds to the Georgetown section of Washington, D.C. According to data record 202, the user has requested a web page having a URL of "sampleURL-1" 385 times during a temporal unit associated with a morning commute. Further, according to data record 212, the user has requested a web page having a URL of "sampleURL-2" 143 times during the temporal unit associated with the morning commute.

As discussed above, a popularity of a web site within a geographic region may be quantified according to a number of requests for the web site, e.g., as indicated by popularity indicia 228. In such embodiments, based on the example of FIG. 2, "sampleURL-1," corresponding to data record 202, would be judged more popular during a morning commute of "user1" than "sampleURL-2."

However, popularity data 144 is not limited to exemplary data records 200, as depicted in FIG. 2A. In an additional embodiment, a URL stored within data records 200 may be associated with corresponding metadata. For example, the metadata may include, but is not limited to, editorial and contextual information that describes content delivered by the URL (e.g., an author of the content element and keywords describing the content element) and structural information associated with the delivered content (e.g., a size of the delivered content and a position of the delivered content within a corresponding web page). However, the disclosed embodiments are not limited to such exemplary information, and in further embodiments, the metadata associated with URLs 226 may include any additional or alternate information relevant to the URLs or content delivered by the URLs, without departing from the spirit or scope of the disclosed embodiments.

Figure 2B:
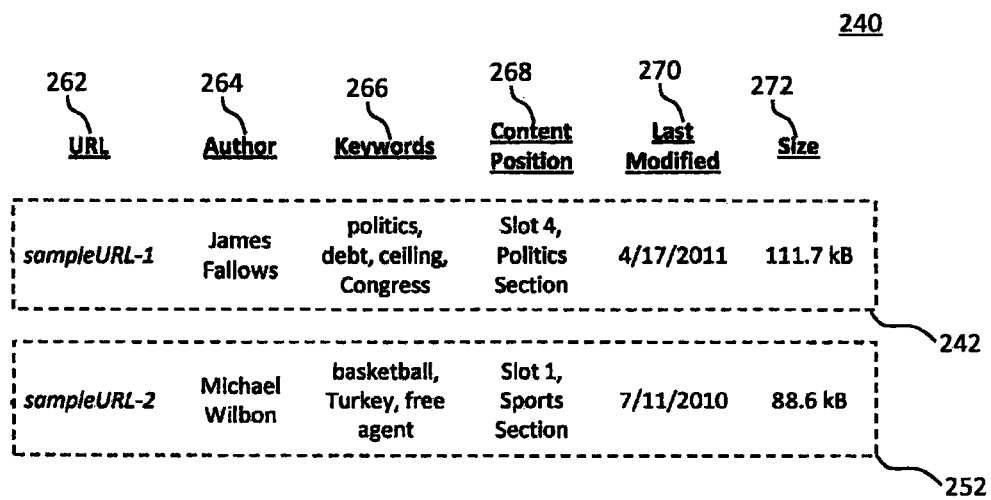

FIG. 2B illustrates exemplary set of metadata 240 that may be linked to the URLs of data records 202 and 212, consistent with disclosed embodiments. In the exemplary embodiment of FIG. 2B, metadata set 240 includes metadata 242 and 252. However, metadata set 240 is not limited to metadata 242 and 252, and in additional embodiments, metadata 240 may include any number of individual elements of metadata without departing from the spirit or scope of the disclosure. Further, in such embodiments, metadata set 240 may be defined using an appropriate markup language, such as XML, or in any additional or alternate format apparent to a person of ordinary skill.

In FIG. 2B, metadata 242 and 252 respectively include an identifier 262 of a URL that delivers corresponding content to a web page, an identifier 264 of an author (or artist) associated with the corresponding content, and keywords 266 that are descriptive of the corresponding content. Further, in FIG. 2B, metadata 242 and 252 respectively include information 268 that indicates a position of the corresponding content within the web page (e.g., a slot within a particular section of the web page), a date 270 on which the corresponding content was last modified, and a size 272 of a file including the corresponding content.

By way of example, metadata 242 may be linked to "sampleURL-1" of data record 202 of FIG. 2A, and metadata 252 linked to "sampleURL-2" of data record 212 of FIG. 2A. According to metadata 242, "sampleURL-1" may be associated with content authored by James Fellows. The delivered content may positioned within "slot 4" of a "Politics" section of a corresponding web page, and the news content may be described using keywords that include "politics," "debt," "ceiling," and "Congress." Further, the delivered content in included within a file having a size of "111.7 kB" that was last modified on Apr. 17, 2011.

Furthermore, according to metadata 252, "sampleURL-2" may be associated with content authored by Michael Wilbon and disposed upon delivery within "slot 1" of a "Sports" section of a corresponding web page. The content associated with "sampleURL-2" may be described using keywords that include, but are not limited to, "basketball," "Turkey," and "free agent." Further, the delivered content in included within a file having a size of "88.6 kB" that was last modified on Jul. 11, 2011.

Referring back to FIG. 1, database 140 also includes page data 146. As discussed above, web server 130 may generate a customized web page that reflects a temporal unit within a geographic region. Upon delivery of the customized web page to the user, web server 130 may store a copy of the customized web page, along with an indication of the temporal unit, in page data 146. In an embodiment, the stored copy of the delivered web page may represent a HTML file or document that includes both data associated with delivered electronic content and layout information defining the spatial positions and format of the content within the customized web page.

Additionally or alternatively, page data 146 may separately store content information and layout information corresponding to each of the customized web pages delivered to the user. For example, the content information may represent metadata defined using an appropriate markup language, such as XML, or in any additional or alternate format apparent to a person of ordinary skill in the art. Further, for example, the layout information may be defined using a style sheet language including, but not limited to, a cascading style sheets (CSS) language, an extensible stylesheet language (XSL).

Further, in an embodiment, the information corresponding to the delivered web pages may be stored within page data 146 for a specified time period. For example, the stored information may be maintained within page data 146 for a twelve-hour period, a twenty-four hour period, or any additional or alternate time period that is compatible with the storage limitations imposed by database 140 and/or page data 146.

Database 140 may additionally include content data 148. In an embodiment, content data 148 may include elements electronic content that, for example, may be embedded into a version of a requested web page to be delivered to a client device. For example, the electronic content within content data 148 may include, but is not limited to, textual content, video content, audio content, executable programs (e.g., Java scripts), and/or any additional content that is appropriate for delivery to a client device across network 120.

In an embodiment, web server 130 may coordinate with database 140 to deliver customized electronic content associated with a web page or an electronic resource (e.g., HTML documents, Java scripts, style sheets, digital images, digital video, or digital music associated with a web page) to a client device, e.g., client device 102, in response to a request received from the client device received across network 120. For example, and in response to the received request, web server 130 may generate a version of the requested web page that is customized to reflect a current temporal unit (e.g., temporal segment of the day) associated with the geographical location of the user, which may be transmitted to the client device over network 120.

Figure 3:
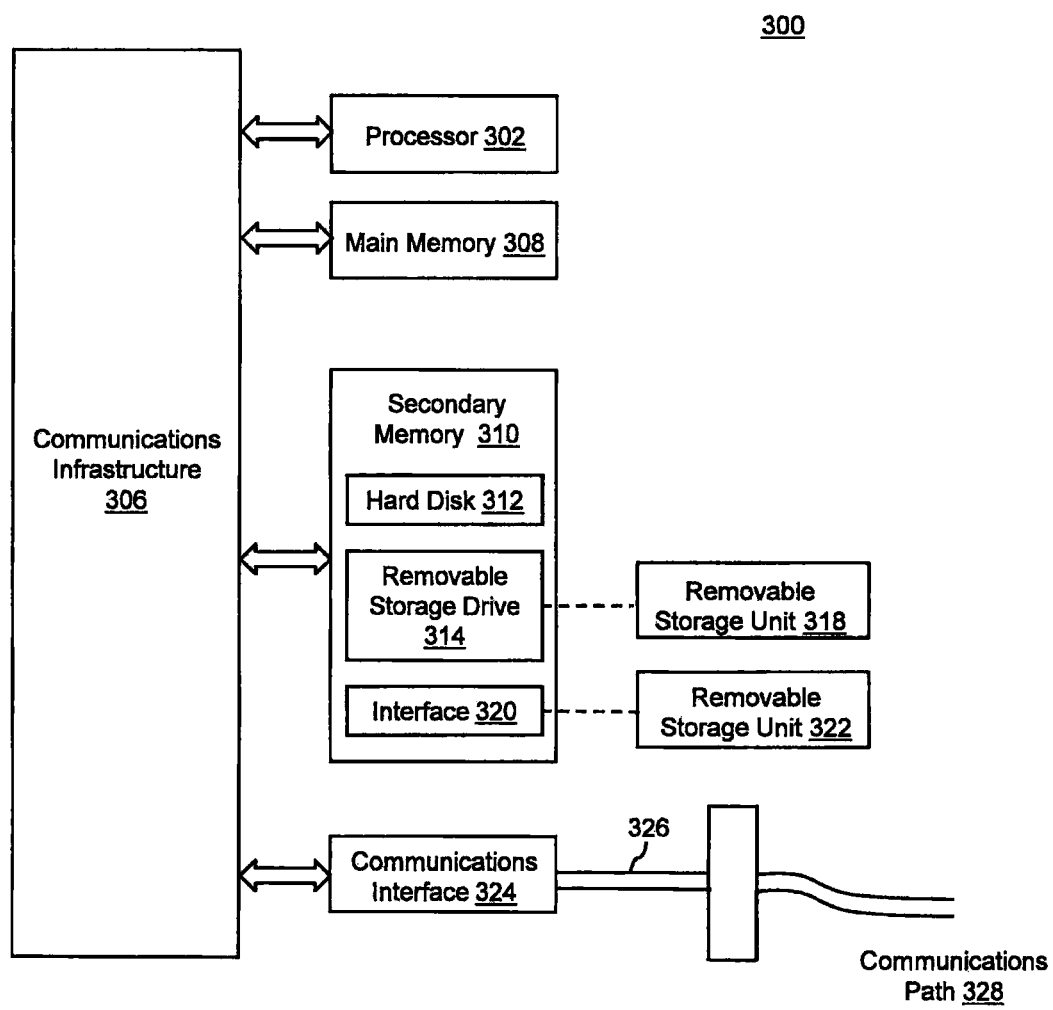
FIG. 3 is a diagram of an exemplary computer system, consistent with embodiments of the present disclosure.

Client devices 102 and 112, web server 130, and database 140 may represent any type of computer system capable of performing communication protocol processing. FIG. 3 is an exemplary computer system 300, according to an embodiment of the present disclosure. Computer system 300 includes one or more processors, such as processor 302. Processor 302 is connected to a communication infrastructure 306, such as a bus or network, e.g., network 120 of FIG. 1.

Computer system 300 also includes a main memory 308, for example, random access memory (RAM), and may include a secondary memory 310. Secondary memory 310 may include, for example, a hard disk drive 312 and/or a removable storage drive 314, representing a magnetic tape drive, an optical disk drive, CD/DVD drive, etc. The removable storage drive 314 reads from and/or writes to a removable storage unit 318 in a well-known manner. Removable storage unit 318 represents a magnetic tape, optical disk, or other computer-readable storage medium that is read by and written to by removable storage drive 314. As will be appreciated, the removable storage unit 318 can represent a computer-readable medium having stored therein computer programs, sets of instructions, code, or data to be executed by processor 302.

In alternate embodiments, secondary memory 310 may include other means for allowing computer programs or sets of instructions to be loaded into computer system 300. Such means may include, for example, a removable storage unit 322 and an interface 320. An example of such means may include a removable memory chip (e.g., EPROM, RAM, ROM, DRAM, EEPROM, flash memory devices, or other volatile or non-volatile memory devices) and associated socket, or other removable storage units 322 and interface 320, which allow instructions and data to be transferred from the removable storage unit 322 to computer system 300.

Computer system 300 may also include one or more communications interfaces, such as communications interface 324. Communications interface 324 allows computer software, instructions, and/or data to be transferred between computer system 300 and external devices. Examples of communications interface 324 may include a modem, a network interface (e.g., an Ethernet card), a communications port, a PCMCIA slot and card, a wireless transmitter or card, etc. Computer software, instructions, and/or data may be transferred via communications interface 324 in the form of signals 326, which may be electronic, electromagnetic, optical or other signals capable of being received by communications interface 324. These signals 326 are provided to communications interface 324 via a communications path (i.e., channel 328). Channel 328 carries signals 326 and may be implemented using wire or cable, fiber optics, an RF link, wireless transmissions, and other communications channels. In an embodiment, signals 326 comprise data packets sent to processor 302. Information representing processed packets can also be sent in the form of signals 326 from processor 302 through communications path 328.

The terms "storage device" and "storage medium" may refer to particular devices including, but not limited to, main memory 308, secondary memory 310, a hard disk installed in hard disk drive 312, and removable storage units 318 and 322. Further, the term "computer-readable medium" may refer to devices including, but not limited to, a hard disk installed in hard disk drive 312, any combination of main memory 308 and secondary memory 310, and removable storage units 318 and 322, which respectively provide computer programs and/or sets of instructions to processor 302 of computer system 300. Such computer programs and sets of instructions can be stored within one or more computer-readable media. Additionally or alternatively, computer programs and sets of instructions may also be received via communications interface 324 and stored on the one or more computer-readable media.

Such computer programs and instructions, when executed by processor 302, enable processor 302 to perform one or more of the computer-implemented methods described herein. Examples of program instructions include, for example, machine code, such as that code produced by a compiler, and files containing a high-level code that can be executed by processor 302 using an interpreter.

The computer-implemented methods described herein can also be implemented on a single processor of a computer system, such as processor 302 of system 300. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

As discussed above, web server 130 may receive and service requests for web pages from a user of a client device, e.g., client device 102. In an embodiment, web server 130 may identify a geographic location associated with a received request, and may deliver to client device 102 a version of the requested web page that is customized to reflect a current temporal unit associated with the geographic location. For example, a user who requests the web page at 9:00 p.m. in Washington, D.C., may receive a version of the web page from web server 130 that includes electronic content that is "popular" among users in Washington, D.C., during the evening hours. In such embodiments, the electronic content may include, but is not limited to, text, images, video, hyperlink, or any additional or alternative variety of media that may be embedded into the requested web page by web server 130 for delivery to client device 102. Further, as discussed above, a popular element of electronic content may be determined based on a number of users in the Washington, D.C., area that requested the element, a combination thereof, and any additional or alternate indicia of popularity apparent to one of skill in the art.

Figure 4:
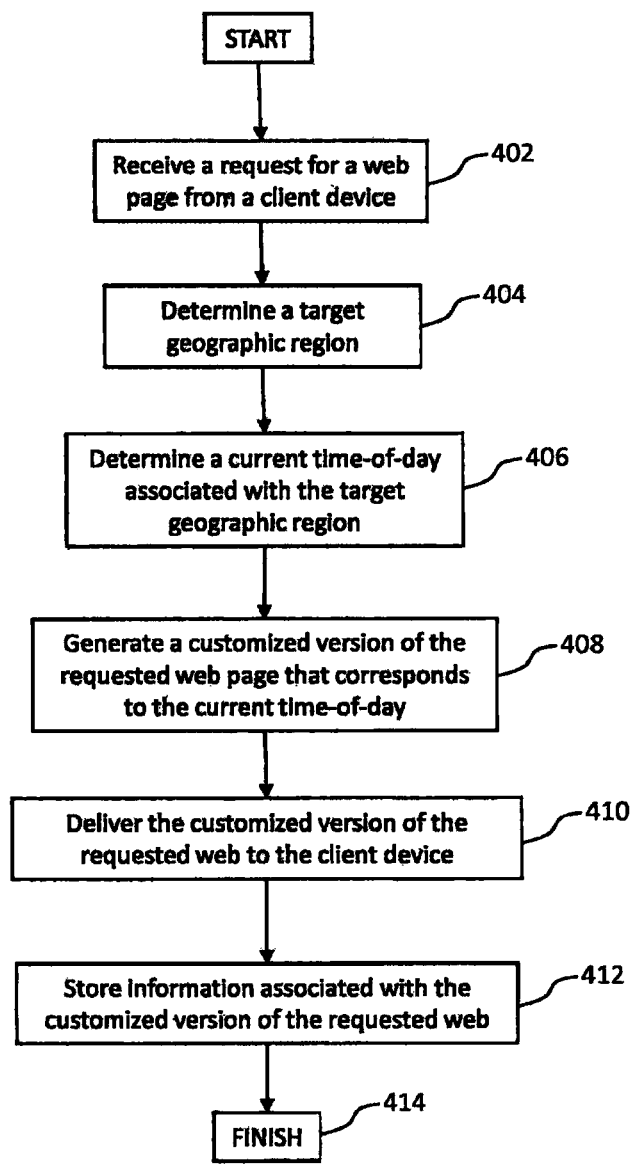
FIG. 4 is a flowchart of an exemplary method for providing customized electronic content to a client device, according to an embodiment of the present disclosure.

FIG. 4 illustrates an exemplary method 400 for providing customized electronic content to a client device, according to a disclosed embodiment. Method 400 may provide functionality that enables a web server, e.g., web server 130, to provide a version of a requested web page that is customized to reflect a current time-of-day of a user, and additionally or alternatively, to reflect preferences for electronic content expressed by the user. For example, the time-relevant version of the web page provided to the user maybe reflective of a time-dependent pattern of media consumption by the user, and may include content relevant to the user regardless of the user's current time zone.

However, although the exemplary embodiment of FIG. 4 is described with reference to a customized version of a web page, it will be appreciated by a person of skill in the art that the exemplary method may be adapted to provide a customized version of any type of electronic content (e.g. videos, audio files, text, blogs, etc.), without departing from the spirit or scope of the disclosed embodiments.

In step 402, web server 130 receives a request for a web page from a client device, e.g., client device 102 of FIG. 1. For example, client device 102 may be configured to execute a browser application capable of rendering standard Internet content, such as Netscape Navigator, Microsoft Internet Explorer, Apple Safari, and/or Mozilla Firefox. In such embodiments, a user of client device 102 may request a particular web page by entering a URL into the browser application, and additionally or alternatively, by selecting a hyperlink displayed by the browser application or by an additional application configured to interface with the browser application (e.g., a word processing program configured to display actionable hyperlinks). The browser application may subsequently transmit the requested URL, and additionally, the IP address of client device 102 and/or an identifier of the user, to web server 130.

In an embodiment, the request for the web page received in step 402 may include an information identifying the requested web page, e.g., a URL of the requested web page. Further, in additional embodiments, the request for the web page may include an IP address that identifies client device 102, and additionally or alternatively, information that identifies the user of client device 102. For example, the information identifying the user may include, but is not limited to, an alpha-numeric identifier (e.g., user identifier 222 of FIG. 2), a login credential that enables the user to securely access web server 130, or any additional or alternate information capable of identifying the user.

In step 404, web server 130 maps the IP address of client device 102 to a target geographic region associated with the request for the web page. For example, the target geographic region corresponding to the IP address may be determined using any of a number of techniques, including, but not limited to, the use of a "WhoIs" utility and the use of a commercial or proprietary lookup service. However, the mapping processes of step 404 is not limited to such exemplary lookup services, and in additional embodiments, web server 130 may leverage any additional or alternate technique to determine the target geographic region associated with the received request.

Using the exemplary processes of step 404, web server 130 may identify a target geographic region associated with a registrant of the received IP address. However, in such embodiments, the target geographic region does not necessarily coincide with the geographic region that includes client device 102, or a user of client device 102.

For example, and as discussed above, client device 102 may represent a mobile device (e.g., a smart phone, a tablet computer, or other mobile device) configured to transmit and receive data using a mobile device network, such as a GSM network or a PCS network. Within such a mobile device network, the IP address associated with the received request may be mapped not to a geographic region that includes client device 102, but instead to a different geographic region that includes a gateway or other server configured to route data to client device 102 over the network. In such an embodiment, web server 130 may leverage one or more geographic preferences of the user of client device 102 to identify a target geographic region corresponding to the received request for the web page, as further discussed below with reference to FIG. 5.

Figure 5:
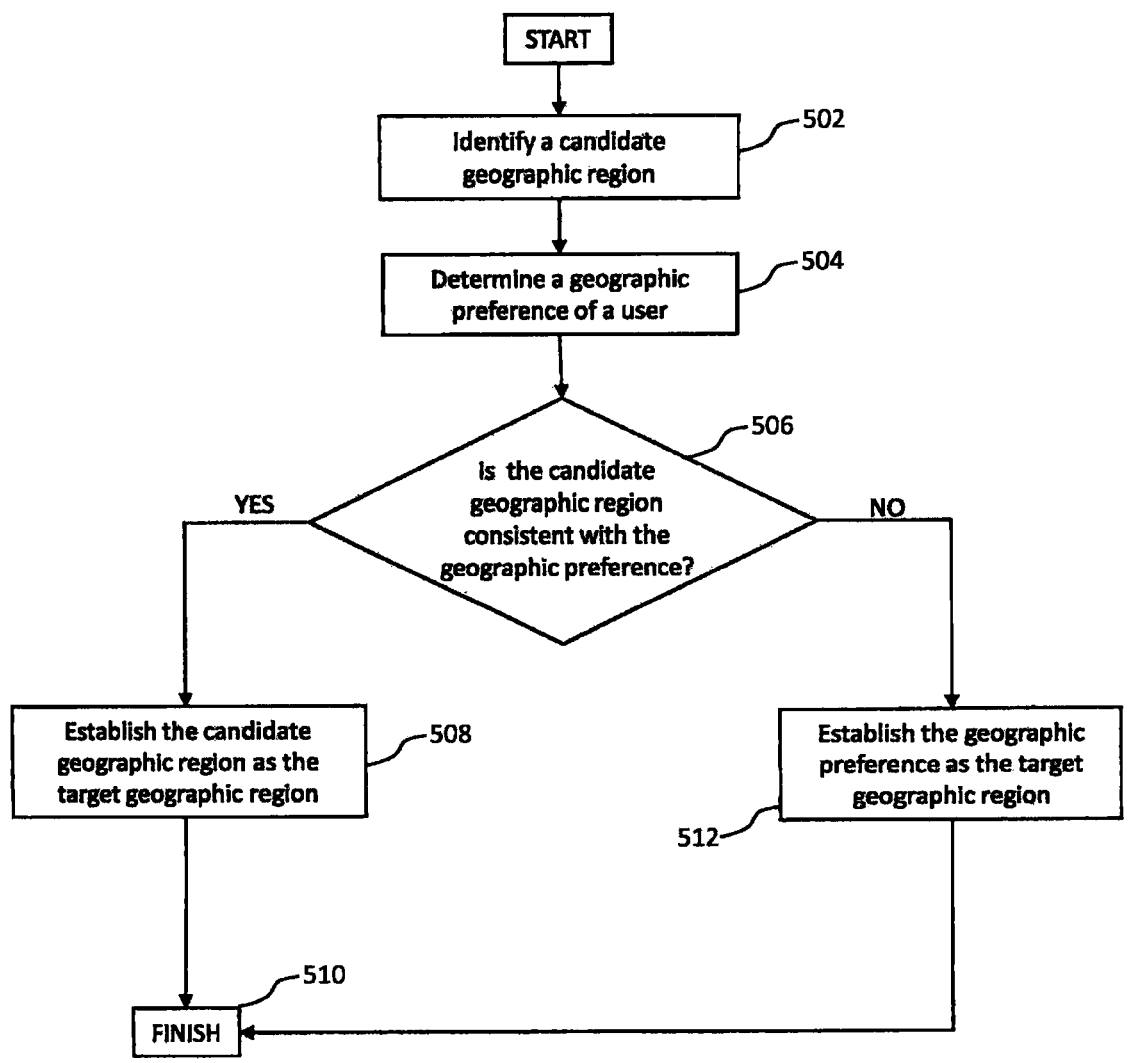
FIG. 5 is a flowchart of an exemplary method for identifying a target geographic region associated with a request for a web page, according to an embodiment of the present disclosure.

FIG. 5 illustrates an exemplary method 500 for identifying a target geographic region associated with a request for a web page, consistent with disclosed embodiments. For example, exemplary method 500 may provide functionality to enable a web server, e.g., web server 130, to identify a target geographic region associated with a request for a web page received from a client device, e.g., client device 102. In an embodiment, method 500 may be incorporated into step 404 of FIG. 4 to identify the target geographical location based on an IP address associated with client device 102 and on a geographical preference expressed by a user of client device 102.

In FIG. 5, web server 130 may identify a candidate geographic region in step 402 based on, for example, an IP address included within a request for a web page. As discussed above, the request for the web page may be received from a client device, e.g., client device 102, over network 120, and may include both a URL of the requested web page and an IP address of client device 102. In additional embodiments, the request for the web page may also include information that identifies a user of client device 102, for example, an alpha-numeric identifier uniquely assigned to the user.

As discussed above, the candidate geographic region may be determined using any of a number of techniques apparent, including, but not limited to, the use of a "WhoIs" utility and the use of a commercial or proprietary lookup service. However, the mapping processes of step 304 are not limited to such exemplary lookup services, and in additional embodiments, web server 130 may leverage any additional or alternate technique to determine a geographic region associated with the received request.

In step 504, web server 130 determines a geographic preference associated with the requesting user. For example, the user may be associated with profile data stored in, for example, user profile data 142 of FIG. 1, and the profile data for the user may indicate preferred geographic region (i.e., the geographic preference). In such embodiments, web server 130 may leverage the user identifier included within the request to retrieve the profile data record corresponding to the user in step 504, and may subsequently process the retrieved profile data record to identify the geographic preference of the user.

However, the determination of the geographic preference of the user in step 504 is not limited to the use of stored profile data, e.g., user profile data 142 of FIG. 1. In additional embodiments, a profile data record associated with a requesting user may be obtained through any of a number of programmatic techniques, which include, but are not limited to, HTTP cookies, local shared objects (e.g., flash cookies), and any additional or alternate technique apparent to one of skill in the art.

Further, the determination of the geographic preference of the user in step 504 need not be based on user profile data. In additional embodiments, the determination of the geographic preference may leverage popularity data associated with the user and stored, for example, in popularity data 144 of FIG. 1. As discussed above, the popularity data associated with the user may indicate a popularity of electronic content (e.g., web sites, web pages, or advertisements) requested by that user within a corresponding geographic region.

In such an embodiment, web server 130 may retrieve the popularity data associated with the user identifier of the user, and may process the individual data records to identify the geographic preference of the user. For example, the geographic preference may be identified on a basis of one or more geographic identifiers associated with the retrieved popularity data records (e.g., identifier 224 of FIG. 2).

By way of example, requesting user may access web server 130 to request advertisements concerning services and goods for sale in Washington, D.C., and to request real estate listings for homes in Mclean, Va. In such embodiments, web server 130 may process the popularity data associated with the user to identify the Washington, D.C., area as the geographic preference of the requesting user.

However, the determination of the not limited to such exemplary processes. In further embodiments, web server 130 may directly query the requesting user to establish the geographic preference of the user in step 504. For example, web server 130 may generate a message to the requesting user that prompts the user to enter a preferred geographic region (e.g., by name or zip code). The generated message may be transferred to client device 102 across network 120 using any of the exemplary communications outlined above, and upon receipt of a response from client device 102, web server 130 may process the response and establish the received geographic location as the geographic preference of the user.

Further, in additional embodiments, the geographic preference of the user may correspond to a current geographic position of client device 102. For example, client device 102 may be equipped with a receiver configured to interact with a global positioning system (GPS) and receive data regarding a position of the receiver at a particular time, e.g., a longitude and latitude of the GPS receiver. However, the received data is not limited to such values, and in additional embodiments, the received position data may include a current elevation of the GPS receiver and one or more derived quantities, such as a speed of the GPS receiver and a travel direction of the GPS receiver, without departing from the spirit or scope of the disclosed embodiments.

In such an embodiment, the GPS receiver of client device 102 may receive the positional data, and client device 102 may determine the current geographic position based on at least a portion of the received positional data (e.g., the current latitude and longitude of client device 102). Client device 102 may subsequently transmit the current geographic position to web server 130 across network 120 at periodic or specific intervals, or alternatively, upon receipt of a query from web server 130. As discussed above, upon receipt of the transmission, web server 130 may process the message and establish the received geographic location as the geographic preference of the user.

Referring back to FIG. 5, in step 506, web server 130 determines whether the candidate geographic region is consistent with the user's geographic preference. By way of example, the candidate geographic region and the one or more geographic preferences may be associated with corresponding geo-spatial identifiers, e.g., "Where On Earth IDs" (WOEIDs) assigned by the Yahoo Developer Network. In an embodiment, the assignment of a WOEID to a corresponding geographic region enables web server 130 to access a geo-spatial database (e.g., a GeoPlanet Web Service developed and maintained by the Yahoo! Developer Network) and retrieve a set of geo-spatial coordinates associated with a centroid of the geographic region (e.g., longitude, latitude, and altitude), and additionally or alternatively, data indicative of a parent-child relationship between geographic region and one or more additional regions.

For example, the Georgetown section of Washington, D.C., may be assigned a WOEID of "2409617," and upon accessing an appropriate geo-spatial data base, web server 130 may determine that the Georgetown section of Washington, D.C., is located at a latitude of 38.905022, and a longitude of −77.062798. Furthermore, using the WOEID of Georgetown, web server 130 may determine that Georgetown is a "parent" of geographic regions corresponding to Montrose Park and Georgetown University, and that Georgetown is a "child" of a geographic region corresponding to Northwest Washington, D.C.

Web server 130 may deem the candidate geographic region consistent with the user's geographic preference in step 506 when a displacement between the candidate geographic region and the user's geographic preference falls within a predetermined threshold value. In an embodiment, web server 130 may obtain the geo-spatial coordinates associated with the candidate geographic region and the user's geographic preference, and may compute the displacement between the candidate geographic region and the user's geographic preference based on at least the retrieved geo-spatial coordinates. By way of example, web server 130 may retrieve the geo-spatial coordinates based on corresponding geo-spatial identifiers assigned to the candidate geographic region and the user's geographic preference (e.g., a WOEID), or using any additional technique apparent to one of skill in the art and appropriate to the candidate geographic region and the user's geographic preference.

However, the determination of the consistency between the candidate geographic region and the user's geographic preference is not limited to such exemplary techniques. In additional embodiments, web server 130 may deem the candidate geographic region and the user's geographic preference to be consistent in step 506 when a parent-child relationship exists between the candidate geographic region and the user's geographic preference, based on, for example, information retrieved from the geo-spatial database.

For example, and as described above, a candidate geographic region may correspond to the Georgetown section of Washington, D.C., and the user's preferred location may correspond to Georgetown University. In such an embodiment, web server 130 may determine that the candidate geographic region is consistent with the user's geographic preference, due to the parent-child relationship that exists between Georgetown and Georgetown University.

If it is determined in step 506 that the candidate geographic region is consistent with the user's geographic preference, then when web server 130 may establish the candidate geographic region as the target geographic region in step 508. The target geographic location is subsequently passed back to step 406 of FIG. 4, which determines a current time-of-day associated with the target geographic region, and method 500 is then completed in step 510.

However, if it is determined in step 506 that the candidate geographic region is not consistent with the user's geographic preference, the web server 130 may establish the user's geographic preference as the target geographic region in step 512. In such an embodiment, the candidate geographic region may be associated with a gateway server of an Internet service provider (ISP) of client device 102 that is disposed in a location geographically remote from the user of client device 102. The target geographic location is subsequently passed back to step 406 of FIG. 4, which determines a current time-of-day associated with the target geographic location, and method 500 is then completed in step 510.

Using the embodiments described above, web server 130 may identify the target geographic location based on an IP address associated with a request for a web page received from client device 102, and additionally or alternatively, based on a geographic preference of a user of client device 102. However, the disclosed embodiments are not limited to such exemplary techniques, and in additional embodiments, web server 130 may determine the target geographic region based on a physical location of client device 102, for example, as transmitted to web server 130 within the request for the web page.

As described above, client device 102 may represent a mobile device (e.g., a smart phone, a tablet computer, or other mobile device) configured to transmit and receive data using a mobile device network. In such an embodiment, client device 102 may be equipped with a receiver configured to interact with a global positioning system (GPS) and receive data regarding a position of the receiver at a particular time, including, but not limited to, a longitude and latitude of the GPS receiver at the particular time.

In such embodiments, client device 102 may generate the request for the web page that includes, for example, the requested URL and the positional information associated with client device 102, and may transmit the request for the web page to web server 130. Web server 130 may receive the request for the web page in step 402, and may process the received request to identify the positional information associated with client device 102. Web server 130 may subsequently identify a geographic region associated with the received positional information, and establish the identified geographic region as the target geographic region in step 404.

Referring back to FIG. 4, web server 130 may determine a current time-of-day associated with the target geographic region in step 406. In an embodiment, web server 130 may determine the current time of the target geographic region in step 306 by identifying a time zone that includes the target geographic region, and then by subsequently identifying an offset from coordinated universal time (UTC) associated with the time zone. For example, a target region corresponding to the Georgetown section of Washington, D.C. is included within an Eastern time zone that is associated with a five-hour offset from UTC.

However, the determination of the current time in step 406 is not limited to such exemplary processes. In additional embodiments, the current time-of-day of the target region may be specified as a component of the request received in step 402, may be specified by the user in response to a prompt generated by web server 130 (e.g., through a pop up window displayed to the user via client device 102), or may be determined using any of a number of additional techniques that are appropriate to web server 130 and client device 102.

In step 408, web server 130 generates a version of the web page that corresponds to the current time-of-day within the target region, and additionally or alternatively, that comports with individual preferences of a user or groups of similar users within the target region. In such an embodiment, the generated version of the web page may include electronic content that is consistent with the user's consumption of media during a time period that includes the current time-of-day (i.e., a temporal unit), and that is customized to reflect preferences of individual users and/or groups of similarly-situated users.

For example, an analysis of popularity data for electronic content accessed by users of web server 130 may indicate a broad interest in local weather conditions, local traffic conditions, and breaking local news stories during a time period corresponding to a morning commute. However, in contrast, a similar analysis of the popularity data may indicate a broad interest in entertainment, sports, and social network during a time period corresponding to late evening. Furthermore, a specific user of client device 102 may exhibit a preference for electronic content in textual form that relates to local sports, political, and economic news, as stored within records of user profile data 142 of FIG. 1, for example.

Thus, using the exemplary processes of step 408, web server 130 may generate a "morning commute" version of the requested web page for the specific user that includes textual content related to local weather and traffic conditions, and to local political and economic news. Similarly, using the exemplary processes of step 408, web server 130 may generate an "evening" version of the requested web page for the specific user that incorporates textual content related to entertainment and local sports news, and that includes recent postings and content from one or more social networking services (e.g., Facebook, LinkedIn, and MySpace) to which the specific user subscribes.

The generated version of the requested web page may then be transmitted in step 410 to client device 102 across network 120, using one or more of the communications protocols identified above. In certain embodiments, the generated web page may include embedded electronic content (e.g., videos or images) that must be retrieved from an additional web server across network 120. In such an embodiment, a HTML document or file associated with the customized web page may include instructions that automatically cause a browser of client device 102 to request and retrieve one or more portions of the requested electronic content from other web servers. Upon receipt of the requested electronic content, from web server 130 and/or other web servers (as instructed), the browser application of client device 102 may render the received content and display the rendered content to the user.

Further, in step 412, web server 130 may store a copy of the generated web page, with an indication of the corresponding time-of-day, within page data 146 of database 140, and method 400 is complete in step 414. In an embodiment, web server may store in step 412 a HTML document or file that includes a complete record of the layout elements and the corresponding electronic content associated with the delivered web page. However, in additional embodiments, web server 130 may maintain a separation between the layout elements of the generated web page (e.g., maintained as instructions in XSL or CSS format) and the content information, which may be stored within page data 146 as metadata defined using an appropriate markup language, such as XML.

Figure 6:
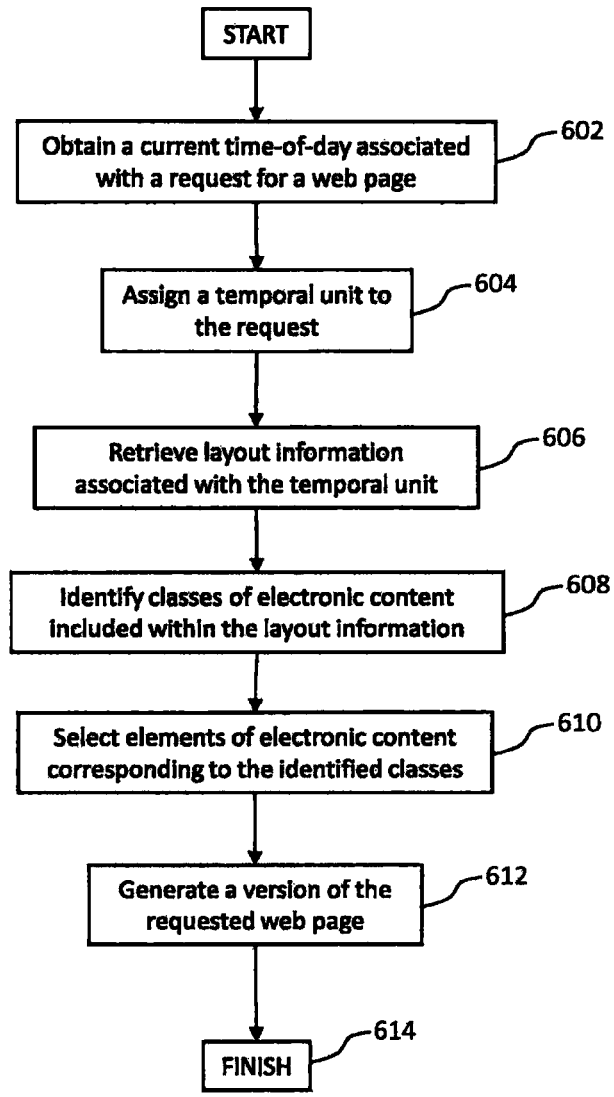
FIG. 6 is a flowchart of an exemplary method for generating a customized version of a web page, according to an embodiment of the present disclosure.

FIG. 6 is a flow diagram of an exemplary method 600 for generating a customized version of the web page, according to an embodiment. For example, method 600 may provide functionality to enable a web server, e.g., web server 130, to generate a version of the web page that corresponds to the current time-of-day within a target geographic region, and additionally or alternatively, that comports with individual preferences of a user or of groups of similar users within the target geographic region. In an embodiment, method 600 may be may be incorporated into step 408 of FIG. 4 to generate, in response to a request from a client device, a version of a requested web page that corresponds to a current time-of-day within a geographic region associated with the client device.

In step 602, web server 130 obtains a current time-of-day associated with a request for a web page received by a client device, e.g., client device 102, and a uniform resource locator (URL) that identifies the requested web page. For example, and as described above, web server 130 may receive the request for a web page from client device 102, and may identify a target geographic region based on an IP address associated with the received request, and additionally or alternatively, based on a geographic preference of the user. Upon identification of the target geographical region, web server 130 may determine a current time-of-day within the target geographical region, for example, by identifying an offset from UTC associated with a time zone that includes the target geographical region, as outlined above in reference to FIG. 4.

Web server 130 subsequently determines a temporal unit in step 604 that corresponds to the current time-of-day. In an embodiment, the temporal unit identified in step 604 may represent one of a plurality of discrete time buckets into which a twenty-four hour day is partitioned. For example, the temporal units may represent respective multiple-hours portions of the day, including, but not limited to morning, mid-day, afternoon, and evening. Alternatively, the day may be finely partitioned into temporal units of, for example, fifteen minutes, thirty minutes, sixty minutes, etc.

In step 606, web server 130 retrieves layout information associated with a version of the requested web page that corresponds to the identified temporal unit. In an embodiment, the retrieved layout information may specify a visual layout of the version of the requested web page that will be delivered to client device 102 during the identified temporal unit.

For example, the retrieved layout information may identify one or more classes of electronic content that may be relevant to a user during the temporal unit, and additionally, may define formatting and spatial positions of the such content within a delivered version of the requested web page. In such embodiments, the layout information may be retrieved by web server 130 from a corresponding repository (e.g., page data 146 of FIG. 1), and may be defined using a style sheet language that includes, but is not limited to, a cascading style sheets (CSS) language, or an extensible stylesheet language (XSL).

In an embodiment, the layout information retrieved in step 606 may be associated with a previously-delivered version of the requested web page that corresponds to the identified temporal unit. For example, and as discussed above, web server 130 may be configured to store each version of the requested web page, with an indication of the corresponding temporal unit, within page data 146. In such embodiments, information describing the content of the generated versions of the requested web page may be stored in a format separate from corresponding layout information, and web server 130 may access page data 146 to retrieve layout information associated with the requested URL and temporal unit in step 606.

However, in additional embodiments, the layout information retrieved in step 606 may be generated through a process that leverages both algorithmic techniques and human editorial input. For example, web server 130 may employ algorithmic techniques to select specific classes of electronic content of potential relevance to the user during the identified temporal unit. A web designer, administrator, or other appropriate individual may subsequently provide web server 130 with editorial input that defines the visual layout of electronic content associated with the selected classes within a delivered version of the requested web page. In such embodiments, web server 130 may generate the layout information based on a combination of the algorithmically-selected classes of content and the human editorial input, as further described below with reference to FIG. 7.

Figure 7:
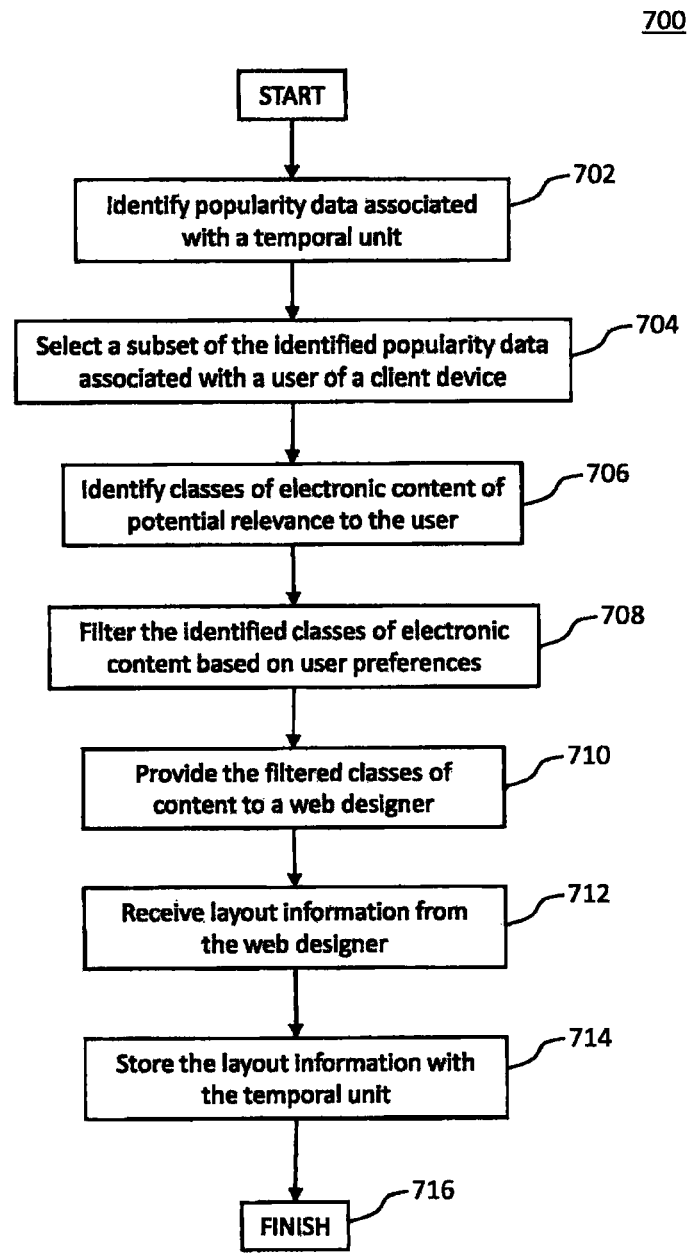
FIG. 7 is a flowchart of an exemplary method for generating layout information for a web page, according to an embodiment of the present disclosure.

FIG. 7 is a flow diagram of an exemplary method 700 for generating layout information for a web page, according to an embodiment. For example, method 700 may provide functionality to enable a web server, e.g., web server 130, to generate layout information for a version of the requested web page that corresponds to the current time-of-day within a target geographic region. In an embodiment, method 700 may be may be utilized to generate layout information that specifies a visual layout of a version of a requested web page delivered to client device 102 during an identified temporal unit, which may be retrieved by web server 130 in step 606 of FIG. 6.

For example, and as discussed above, web server 130 may receive a request for a web page from client device 102. In an embodiment, web server 130 may identify a target geographic region associated with an IP address of client device 102, or alternatively, with a geographic preference expressed by a user of client device 102. Further, in such embodiments, web server 130 may identify a current time-of-day associated with the target geographic region, and may subsequently assign a temporal unit to the received request based on the current time-of-day.

In step 602, web server 130 may process popularity data to identify a plurality of data records associated with the assigned temporal unit. As discussed above, the popularity data may be stored within a corresponding repository (e.g., popularity data 144 of FIG. 1) that is accessible to web server 130, and the popularity data may include individual data records associated with corresponding temporal units and indicative of a "popularity" of electronic content (e.g., web sites, web pages, or advertisements) accessed by users of web server 130 during the respective temporal units. In an embodiment, in step 702, web server 130 may access the stored popularity data, and may process the stored popularity data to identify the plurality of data records having temporal units corresponding to the assigned temporal unit.

Web server 130 processes the identified data records in step 704 to select a subset of the identified data records that correspond to the user of client device 102. In an embodiment, the subset selected in step 704 may include individual data records that correspond to electronic content requested by the user of client device 102. As discussed above, each of the identified data records may be associated with a corresponding user, and may reference a corresponding alpha-numeric identifier of that user. In such embodiments, the processing of step 704 may leverage an alpha-numeric identifier of the user of client device 102 (e.g., as received by web server 130 in the request for the web page) to select the subset of the identified data records that corresponds to the user of client device 102.

In additional embodiments, web server 130 may identify a group of users that, collectively, are representative of the user of client device 102, and the subset of the identified data records selected in step 704 may include individual data records that correspond to the electronic content requested by group of users. In such embodiments, the group of users may be associated with corresponding alpha-numeric identifiers, and the processing of step 704 may leverage the alpha-numeric identifiers of the group to select the subset of the identified data records that corresponds to group of users.

For example, the group of users identified by web server 130 may include those users of web service 130 that reside within, work within, and/or pass through the target geographic region associated with the received request for the web page. For example, a group of users may include those users who reside within a particular time zone (e.g., Eastern daylight time (EDT)), a particular city or state (e.g., Washington, D.C.), or particular zip code (e.g., 20007), or within a threshold distance of a particular geographic location (e.g., 3047 N Street, N.W.).

However, the group of users is not limited to such exemplary geographic segmentations of the user population, and in additional embodiments, the group of users may include those users that share a common demographic profile with the user of client device 102. For example, and as discussed above, the user of client device 102 may be associated with a corresponding set of profile data (e.g., user profile data 142 of FIG. 1) accessible to web server 130. In such embodiments, the profile data associated with the user of client device 102 may define one or more demographic parameters that include, but are not limited to, an age of the user of client device 102, a marital status of the user of client device 102, and a professional license obtained by the user of client device 102.

In such embodiments, the group of users selected by web server 130 may include additional users of web server 130 that share one or more common demographic parameters with the user of client device 102. For example, the user of client device 102 may represent a single, thirty-four year old attorney living in Washington, D.C., and the group of users selected by web server 130 in step 704 may include additional users that share a common age, marital status, and profession as the user of client device 102. However, the group of users need not be based on such exemplary demographic similarities, and in additional embodiments, users may be grouped according to any additional or alternate demographic parameter apparent to one of skill in the art, relevant to the user population, and of use in characterizing the popularity of electronic content within segments of the user population.

Further, in additional embodiments, a group of users associated with an individual data record may include those users that expressed similar preferences for electronic content during the temporal unit, or that have accessed similar electronic content during the temporal unit. For example, a group of users may share a preference for a particular type of electronic content or electronic content associated with a particular author during the evening hours (e.g., as identified through an analysis of profile data records within user profile data 142 and of metadata within popularity data 144), a group may include those users who consistently access a particular element of electronic content during the evening hours, or alternatively, a group may include users who consistently access elements of electronic content disposed at particular positions within a corresponding web page.

Further, for example, web server 130 may select a group of users based on a common membership and/or association with a social networking and/or micro-blogging service, including, but not limited to, Facebook, LinkedIn, MySpace, and Twitter. In such an embodiment, a group of users selected by web server 130 may represent a group of friends from a social networking site, or a group of followers from a micro-blogging site such as Twitter.

Additionally, the group of user selected by web server 130 may include users of web server 130 that have been explicitly identified by the user of client device 102. For example, during a registration process, the user of client device 102 may generate profile data that specifies one or more additional users that collectively form the group. In such embodiments, the user-specified group may represent a number of additional users that share common interests with the user of client device 102, and that would therefore that express similar preferences for electronic content. For example, the user-specified group may correspond to a buddy list associated with an instant messaging application of the user of client device 102, or alternatively, a set of contacts associated with email application, a mobile communications application, or a voice-over-Internet Protocol (VOIP) application of the user of client device 102.

However, the exemplary techniques of step 704 are not limited to such exemplary groupings of users. In additional embodiments, web server 130 may establish a group of users representative of the user of client device 102 based on any additional or alternate criteria that characterizes the content preferences expressed by the users of web server 130 and that is compatible with the stored popularity data, as would be apparent to one of skill in the art.

Referring back to FIG. 7, web server 130 processes the selected subset of data records in step 706 to identify one or more classes of electronic content of potential relevance to the user of client device 102 during the identified temporal unit. In an embodiment, the selected classes of electronic content correspond to a subject taxonomy that identifies specific subjects of interest to users throughout the day. For example, in step 706, individual data records of the selected subset may be categorized according to a specific subject matter of the element of electronic content associated with the individual data records. Examples of such specific subject matter include, but are not limited to, sports, politics, stock markets, particular individuals and/or events referenced within the corresponding electronic content, and any additional or alternate subject matter apparent to a person on skill in the art and appropriate to the electronic content.

Alternatively, the selected classes of electronic content may correspond to a broad taxonomy that identifies specific activities in which users engages throughout the day. In such an embodiment, in step 706, individual data records of the selected subset may be categorized according to activities associated with the elements of electronic content references in the data records. Examples of such activity-based taxonomies include, but are not limited to, reading news, participating in social network activities, entertainment, sporting events, work activities, or any additional or alternate activity that is appropriate to the individual data records.

Additionally, step 706 may leverage metadata associated with the individual data records of the selected subset (e.g., metadata 240 of FIG. 2B) to further categorize the individual data records according to one or more editorial, contextual, or structural properties of corresponding content. For example, using editorial information included within the metadata, step 706 may generate classes of electronic content associated with a common author (or artist) or with a common group of authors (or artists). Step 706 may further leverage contextual information included within the metadata to identify classes of electronic content that are described by a common set of keywords. Additionally, based on structural information associated with the metadata, the classes of electronic content may be associated with specific display positions within a corresponding web page.

Referring back to FIG. 7, in step 708, web server 130 filters the selected classes of electronic content according to the set of content preferences expressed by the user and additionally or alternatively, the set of metadata associated with individual popularity of data records of the identified subset (e.g., metadata 240 of FIG. 2B). For example, in step 708, web server 130 may process the classes of electronic content identified in step 706 to add additional classes of content of particular interest to the user, to limit the scope of an identified class of content (e.g., to require content for the class be delivered in specific format, or content disposed at specific positions within a displayed web page), and additionally or alternatively, to delete an identified class of electronic content that conflicts with a content preference expressed by the user.

As discussed above, profile data associated with the user may indicate one or more user preferences for specific classes of electronic content, and additionally or alternatively, specific formats of electronic content. For example, profile data or the user store in profile data 142 may indicate that the user has expressed interest in receiving electronic content associated with performances by jazz ensembles, but not solo performances of jazz artists. Further, the profile data associated with the user may further specify that the user prefers to such electronic content associated with the performance of the jazz ensembles in digital audio format, but not in digital video form. In such embodiments, the specific content-based preferences may be defined for the user during a registration process, or alternatively, in response to a direct query from web server 130.

Further, the filtering process of step 708 may leverage the metadata associated with the individual data records of the identified subset to further filter the selected classes of electronic content. For example, as discussed above, the selected classes of electronic content may be associated with corresponding authors and/or positions within a displayed web page based on information within corresponding metadata. In such an embodiment, a user preference for a specific author, or alternatively, a user preference for content located in specific portions of a web page, may be used in step 708 to further filter the selected media classes to comport better with a time-dependent content consumption pattern of the user.

In step 710, web server 130 may provide the filtered classes of electronic content to a web designer, administrator, or other individual associated with the design of the requested web page. For example, the filtered classes of content may be provided to the web designer, administrator, or other individual or entity in step 710 with corresponding indicia of relevance as an ordered list.

In an embodiment, the web designer, administrator, or other individual or entity may select one or more of the filtered classes of content for presentation within a delivered version of the requested web page. Based on the selected classes of content and the potential relevance of the selected classes of content to the user, the web designer, administrator, or other individual may generate layout information specify a visual layout of the version of the requested web page delivered to client device 102 during the identified temporal interval. For example, the layout information may define, within a delivered version of the requested web page, spatial positions of electronic content associated with the selected classes, as well as spatial positions and formatting instructions associated with advertisements, content headers and titles, other textual information, and any additional or alternate element that would be displayed to the user of client device 102 within the delivered version. In an embodiment, the generated layout information may be transmitted from web designer, administrator, or other individual or entity to web server 130 across network 120 using any of the communications protocols outlined above.

In step 712, web server 130 receives the generated layout information from the web designer, administrator, or other individual, and may associated with received layout information with the corresponding URL and temporal unit. Web server 130 subsequently stores the received layout information, corresponding URL, and temporal unit within a corresponding repository (e.g., page data 146) in step 714, and method 700 is completed in step 716. In an embodiment, the layout information may be defined using a style sheet language that includes, but is not limited to, a cascading style sheets (CSS) language, or an extensible stylesheet language (XSL).

In an embodiment, the exemplary processes of FIG. 7 may be executed in real-time upon receipt of a request for a web page from a user. However, these exemplary processes may require the retrieval and subsequent processes of substantial volumes of data. In further embodiments, due to the computationally-intensive nature of the exemplary processes of FIG. 7, one or more of steps 702-708 may be executed offline to improve computational efficiency and reduce computational time.

For example, population data may be analyzed offline to identify subsets of individual data records associated with particular temporal unit and specific users, as described above in reference to steps 702 and 704 of FIG. 7. Additionally or alternatively, the subsets of individual data records may be further processed offline to identify corresponding classes of electronic content, which may be filtered offline based on at least one of user profile data or metadata associated with the individual data records, as described above in reference to steps 706 and 708 of FIG. 7. However, the disclosed embodiments are not limited to such exemplary offline processing, and in further embodiment, any additional or alternate step of FIG. 7, or any other appropriate one of the exemplary processes disclosed herein, may be executed offline to improve computational efficiency.

Referring back to FIG. 6, upon retrieval of the layout information in step 606, web server 130 processes the retrieved layout information in step 608 to identify one or more classes of electronic content of potential relevance to the user of client device 102 during identified temporal unit. As discussed above, the retrieved layout information may identify one or more specific classes of electronic content that are potentially relevant to users during the temporal unit, and additionally, may define spatial positions of the such content within a corresponding version of the requested web page. Further, as discussed above, the retrieved layout information may be defined using a style sheet language that includes, but is not limited to, a cascading style sheets (CSS) language, or an extensible stylesheet language (XSL).

In step 610, web server 130 selects electronic content associated with the classes of electronic content included within the retrieved layout information. In an embodiment, one or more elements of electronic content may be stored in a data repository accessible to web server 130 (e.g., content data 148 of FIG. 1), and web server 130 may select one or more elements of the stored electronic content that are associated with the identified classes in step 610. For example, information associated with a local weather forecast and traffic conditions may be stored locally in content data 148, and web server 130 may retrieve the stored local weather forecast and/or the local traffic conditions within the identified classes include "Local Weather" and "Local Traffic Conditions."

However, the selection processes in step 610 are not limited the identification and selection of locally stored electronic content. In additional embodiments, web server 130 may identify relevant electronic content associated with an identified class of content within any additional or alternate data repository accessible by web server 130 across network 120. For example, web server 130 may access a data repository associated with the National Weather Service to obtain information associated with a current weather forecast in response to an identified class of electronic content associated with "Local Weather Conditions."

Furthermore, the selection of electronic content in step 610 is not limited the identification and subsequent retrieval of electronic content stored within local or remote repositories. In additional embodiments, web server 130 may access popularity data (e.g., stored within popularity data 142 of FIG. 1) and process the accessed popularity data to identify popular electronic content associated with the identified classes.

In step 612, the selected electronic content and the retrieved layout information may be leveraged by web server 130 to generate a version of the requested web page that corresponds to the identified temporal unit, and that reflects the preferences of the user of client device 102. For example, web server 130 may generate the version of the requested web page as a HTML document or file that reflects both content data and the retrieved layout information. Once the HTML document or file is generated in step 612, the generated HTML document or file may be passed back to step 410 of FIG. 4, which delivers the version of the requested web page to client device 102 across network 120, and method 600 is then completed in step 614.

In an embodiment, the generated version of the requested web page may include embedded electronic content (e.g., videos or images) that must be retrieved from an additional web server across network 120. In such an embodiment, a HTML document or file associated with the customized web page may include instructions that automatically cause a browser of client device 102 to request and retrieve one or more portions of the requested electronic content from other web servers. Upon receipt of the requested electronic content, from web server 130 and/or other web servers (as instructed), the browser application of client device 102 may render the received content and display the rendered content to the user.

Figure 8:
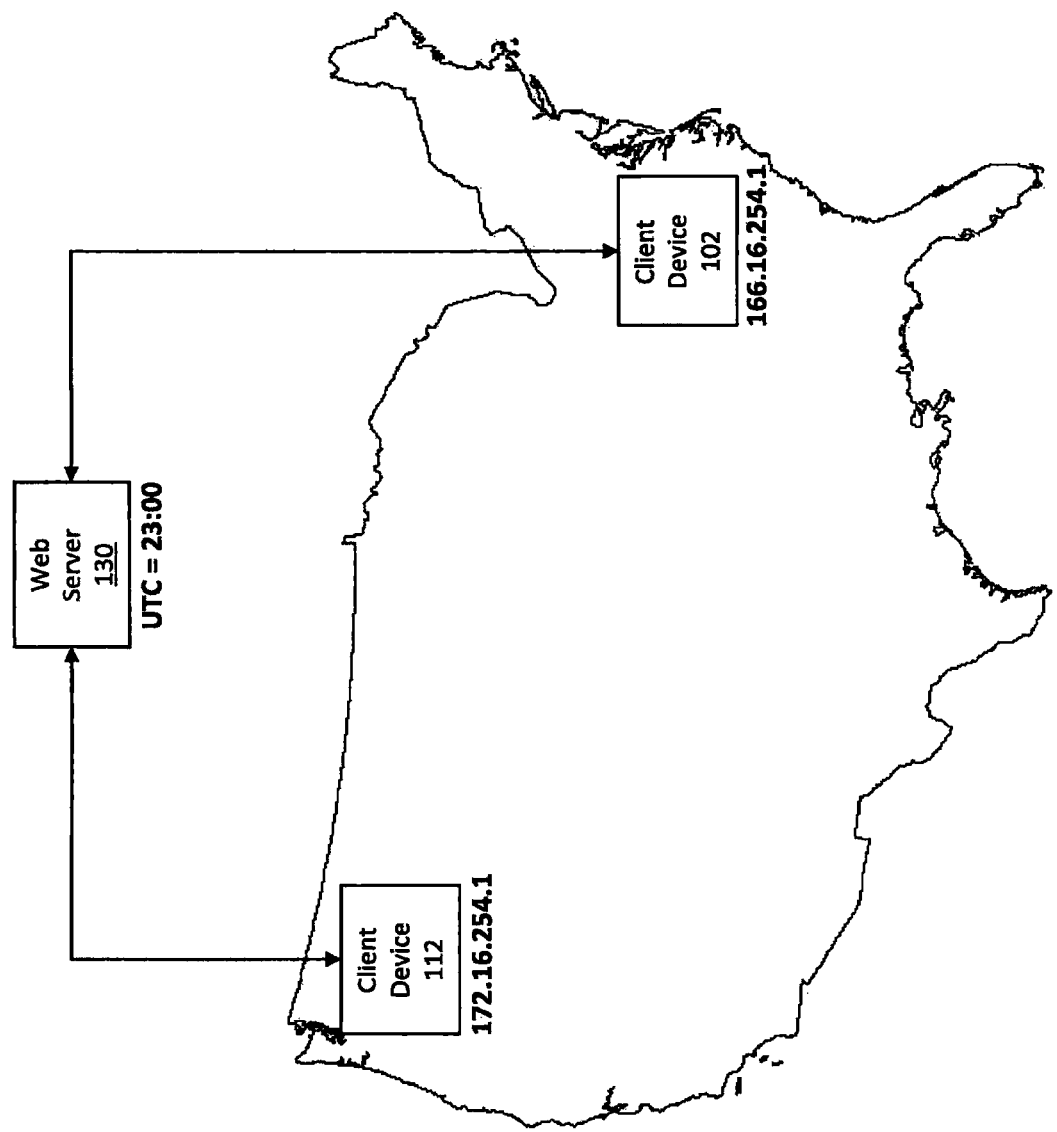
FIG. 8 is a diagram of an exemplary computing environment, according to an additional embodiment of the present disclosure.

According to the disclosed embodiments, web server 130 may receive requests for a web page from users of multiple, geographically-dispersed client devices within network 120, as described below in references to the examples of FIGS. 8-10. FIG. 8 illustrates an exemplary distribution of client devices 102 and 112 within a geographic region. For example, in FIG. 8, client device 102 may be disposed along the East coast of the United States and may be associated with an IP address of "166.16.254.1," while client device 112 may be disposed along the Pacific coast of the United States and may be associated with an IP address of "172.16.254.1." Client devices 102 and 112 may be in communication with web server 130 across a network (e.g., network 120 of FIG. 1) and, although not depicted in FIG. 8, web server 130 may also be in communication with a database (e.g., database 140 of FIG. 1).

In the example of FIG. 8, web server 130 may receive a first request for a web page from a user of client device 102, and may receive a second request for the web page from a user of client device 112. As described above in reference to step 602 of FIG. 6, web server 130 may determine a current time-of-day corresponding to the first request, and a current time-of-day corresponding to the second request.

To determine the current time-of-day, web server 130 may process the IP address associated with the first request to determine that client device 102 is located within Washington, D.C., and may process the IP address of the second request to determine that client device 112 is located within Seattle, Wash. As discussed above, the determination of target geographic region associated with the first and second requests may incorporate any of a number of techniques apparent to one of skill in the art, including, but not limited to, the use of a "WhoIs" utility and the use of a commercial or proprietary lookup service.

Web server 130 subsequently determines that Washington, D.C., is associated with an Eastern daylight time (EDT) zone having a offset of four hours from Coordinate Universal Time (UTC), and that Seattle, Wash., is associated with a Pacific daylight time (PDT) zone having an offset of seven hours from UTC. As described in FIG. 8, the UTC associated with web server 130 is 23:00, and therefore a current time-of-day for the first request associated with Washington, D.C., is 19:00, and a current time-of-day for the second request associated with Seattle, Wash., is 16:00.

Web server 130 may subsequently assign a temporal unit to the first and second requests for the web page, as discussed above in reference to step 604 of FIG. 6. For example, web server 130 may define a temporal unit of "afternoon" that corresponds to a time period between 14:00 and 17:00, and may assign a temporal unit of "evening commute" to a time period between 17:00 and 20:00. As such, the first request corresponding to a current time-of-day in Washington, D.C., is assigned a temporal unit of "evening commute," while the second request corresponding to the current time-of-day in Seattle, Wash., is assigned a temporal unit of "afternoon."

As discussed above in reference to step 606 of FIG. 6, web server 130 may retrieve layout information corresponding to the "evening commute" and the "afternoon" temporal units. As described above, the retrieved layout information may be defined using a style sheet language that includes, but is not limited to, a cascading style sheets (CSS) language, or an extensible stylesheet language (XSL).

For example, using the exemplary processes of step 606 of FIG. 6, web server 130 may determine that users who request content through web server 130 during the "evening commute" may find electronic content associated with local weather conditions, local traffic conditions, and breaking local news to be particularly relevant. As such, the layout information associated with the "evening commute" of users of web server 130 may include layout information that specifies spatial positions of content associated with local weather conditions, local traffic conditions, and breaking local news, as depicted schematically in FIG. 9.

Figure 9:
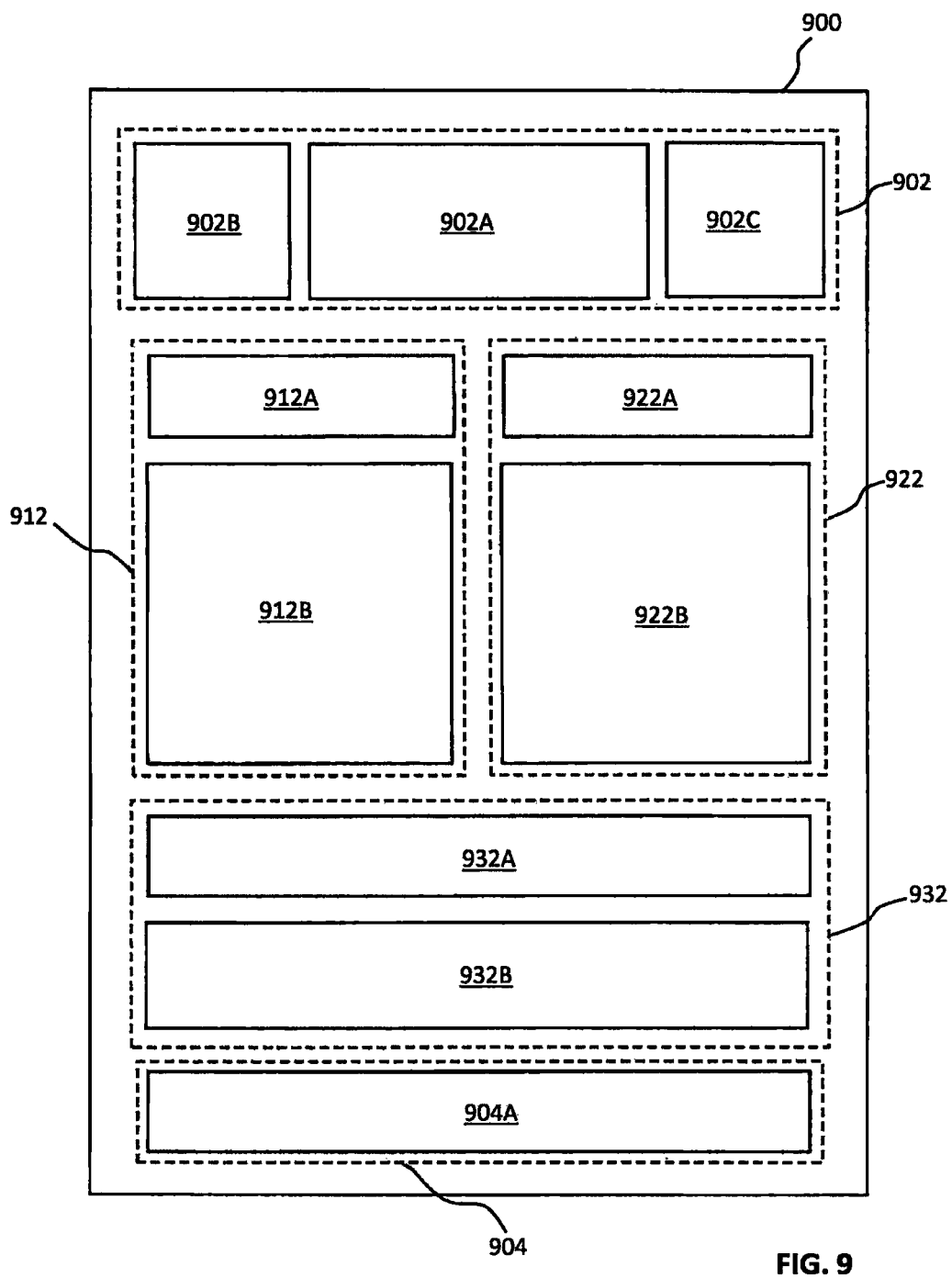
FIGS. 9 and 10 are schematic diagrams of visual layouts of a requested web page, according to additional embodiments of the present disclosure.

FIG. 9 is a schematic diagram 900 of a visual layout of a version of a requested web page delivered to users during an "evening commute," based on corresponding layout information, according to disclosed embodiments. As discussed above, the visual layout of exemplary diagram 900 may indicate spatial positions of headers and electronic content of potential relevance during the "evening commute," and additionally or alternatively, spatial positions of a page header, page footer, and advertisements within the version of the requested web page.

In FIG. 9, diagram 900 indicates spatial positions of a header area 902, content areas 912, 922, and 932, and footer area 904 within an exemplary rendering of the version of the requested web page corresponding to the "evening commute." In an embodiment, header region 902 may include a web page title 902A and corresponding banner ads 902B and 902C, and footer region 904 may include text 904A, including, but not limited to contact information for associated with the requested web site.

Each of content areas 912, 922, and 932 may include corresponding regions for header information (e.g., header regions 912A, 922A, and 932A) and for content information (e.g., content regions 912B, 922B, and 932B). In an embodiment, content regions 912, 922, and 932 may correspond, respectively, to the three content classes identified as being of interest to users during the evening commute, i.e., the local weather conditions, local traffic conditions, and breaking local news.

Further, in such embodiments, the content regions may be assigned to specific classes of electronic content based on the potential relevance of the specific classes of the user of client device 102. For example, more relevant content (e.g., local weather conditions and local traffic conditions) may be embedded within content regions 912 and 922, while less relevant content (e.g., breaking local news) may be embedded within content area 932.

Further, for example, using the exemplary processes of step 606 of FIG. 6, web server 130 may determine that users within the "afternoon" temporal unit may find electronic content associated with breaking national news, current market updates, breaking entertainment news, and a schedule of local sports matches to be of particular relevance. As such, the layout information associated with the "afternoon" may include layout information that specifies spatial positions of content associated with the breaking national news, current market updates, breaking entertainment news, and a schedule of local sports matches, as depicted schematically in FIG. 10.

Figure 10:
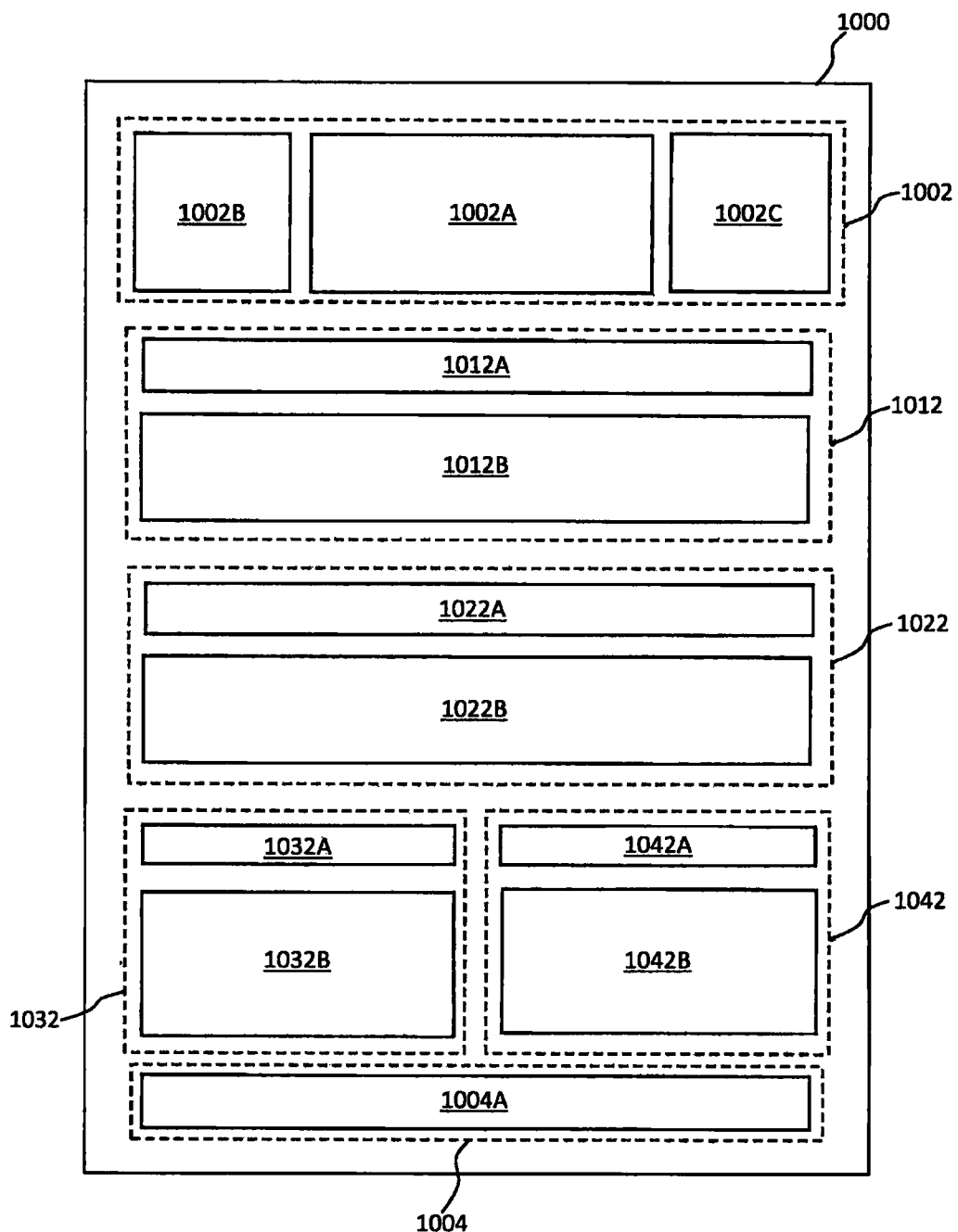

FIG. 10 is a schematic diagram 1000 of a visual layout of a version of a requested web page delivered to users during an "afternoon," based on corresponding layout information, according to disclosed embodiments. As discussed above, the visual layout of exemplary diagram 1000 may indicate spatial positions of headers and electronic content associated with the classes of electronic content of potential relevance during the "afternoon," and additionally or alternatively, spatial positions of the page header, page footer, and advertisements positions within the version of the requested web page.

In FIG. 10, diagram 1000 indicates spatial positions of a header area 1002, content areas 1012, 1022, 1032, and 1042 and footer area 1004 within an exemplary rendering of the version of the requested web page corresponding to the "afternoon." As discussed above in reference to FIG. 9, header region 1002 may include a web page title 1002A and corresponding banner ads 1002B and 1002C, and footer region 1004 may include text 1004A, including, but not limited to contact information for associated with the requested web site. Furthermore, each of content areas 1012, 1022, 1032, and 1042 may include corresponding regions for header information (e.g., header regions 1012A, 1022A, 1032A, and 1042A) and for content information (e.g., content regions 1012B, 1022B, 1032B, and 1042B).

In an embodiment, content regions 1012, 1022, 1032, and 1042 may correspond, respectively, to the four content classes identified as being of interest to users during the evening commute, i.e., breaking national news, current market updates, breaking entertainment news, and a schedule of local sports matches. Further, in such embodiments, the content regions may be assigned to specific classes of electronic content based on the potential relevance of the specific classes of the user of client device 102. For example, more relevant content (e.g., the breaking national news, current market updates) may be assigned to content regions 1012 and 1022, while less relevant content (e.g., breaking entertainment news and a schedule of local sports) matches may be embedded within content areas 1032 and 1042.

Once web server 130 retrieves that layout information corresponding to the "afternoon" and "evening commute" versions of the requested web page, web server 130 may identify corresponding classes of electronic content included within the layout information, and may select electronic content corresponding to the identified classes of electronic content, as described above in reference to steps 608 and 610 of FIG. 6. Web server 130 may subsequently generate the versions of the requested web page corresponding to the "afternoon" and "evening commute" temporal units, based on at least the retrieved layout information and on the selected electronic content, as described above in reference to step 612 of FIG. 6.

Upon generation of the versions of the requested web page corresponding to the "afternoon" and the "evening commute," web server 130 may transmit the version of the requested web page corresponding to the "evening commute" to the first user of client device 102, and may transmit the version of the requested web page corresponding to the "afternoon" to the second user of client device 112, as described above in reference to step 410 of FIG. 4. Furthermore, as described above in reference to step 412 of FIG. 4, copies of the generated versions may be stored, for example, in page data 146 of FIG. 1.

Using the exemplary techniques described above, web server 130 receive a request for web page, and may deliver a version of the requested web page that is customized to a current time-of-day associated with the request. In such embodiments, the current time-of-day may be associated with a target geographic region mapped to an IP address of the received request, as described above in reference to FIG. 4.

However, in additional embodiments, the mapping processes outlined above may be unable to identify the target geographic region associated with the received request. For example, the IP address associated with the received request may not be available to a "WhoIs" utility, or may not be included within any of a number of commercial or proprietary lookup services. Additionally or alternatively, a user of a client device that provided the request may be unable or unwilling to specify a geographic preference that may serve as the target geographic region.

In such an embodiment, web server 130 may generate a generic version of the requested web page that include a subset of electronic content globally popular with the users of web server 130 across all relevant geographic regions. The generic version of the web page, while not being including content specific to the requesting user or a group representative of the requested user, may nonetheless include electronic content that is potentially relevant to the user of client device 102. The generated generic version of the web page may subsequently be transmitted to client device 102 as a HTML document or file across network 120 using any of the communications protocols outlined above.

Further, in additional embodiments, a user of client device (e.g., client device 102) may wish to view a version of the requested web page that was delivered to user at an earlier time. For example, the user may realize that a particular element of electronic content was delivered during a morning commute, and the user may wish "rewind" the currently displayed version of the requested web page to view that particular element of electronic content. In such an embodiment, web server 130 may leverage stored copies of the web page to deliver to the user a copy of the web page corresponding to an earlier temporal unit, as further described below with reference to FIG. 11.

Figure 11:
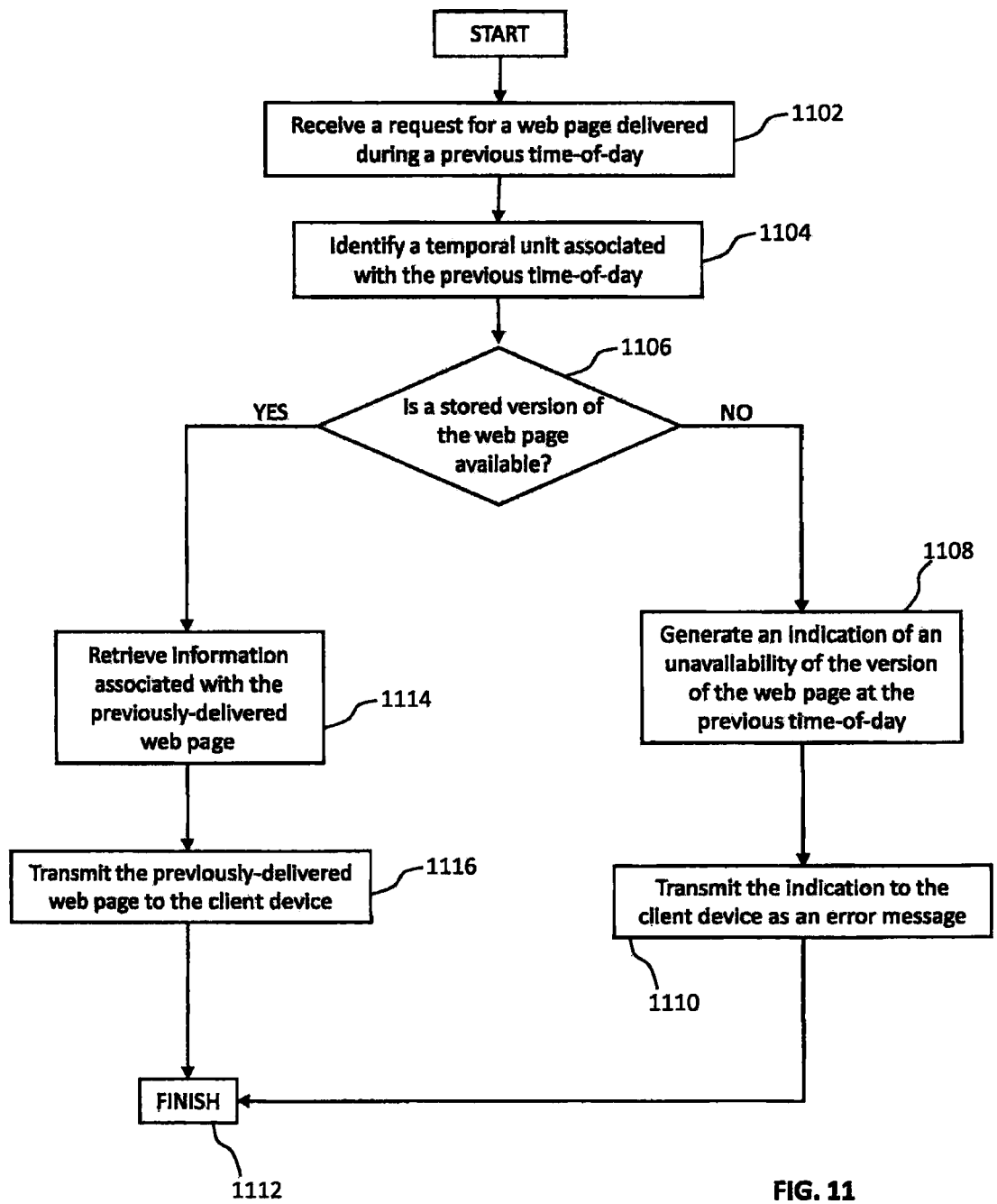
FIG. 11 is a flowchart of an exemplary method for customized electronic content to a client device, according to an embodiment of the present disclosure.

FIG. 11 illustrates an exemplary method 1100 for providing customized electronic content to a client device, according to an additional embodiment of the present disclosure. For example, method 1100 may provide functionality to enable a web server, e.g., web server 130, to deliver a version of a requested web page that is customized to reflect a previous time-of-day. Further, while the exemplary embodiment of FIG. 11 is described with reference to a customized version of a web page, it will be appreciated by a person of skill in the art that the exemplary processes of FIG. 11 may be adapted to provide a customized version of any type of electronic content (e.g. videos, audio files, text, blogs, etc.), without departing from the spirit or scope of the disclosed embodiments.

In step 1102, web server 130 receives, from a client device (e.g., client device 102), a request for a previously-delivered version of web page. In an embodiment, the request for the previously-delivered version web page may include an information identifying the requested web page, e.g., a URL of the requested web page, and information identifying a time-of-day associated with the previously-delivered web page. Further, in additional embodiments, the request for the web page may include an IP address that identifies client device 102, and additionally or alternatively, information that identifies the user of client device 102. For example, such identifying information may include, but is not limited to, an alpha-numeric identifier (e.g., identifier 222 of FIG. 2), a login credential that enables the user to securely access web server 130, or any additional or alternate information that identifies the user and that is appropriate to web server 130.

For example, client device 102 may be configured to execute a browser application capable of rendering standard Internet content, such as Netscape Navigator, Microsoft Internet Explorer, Apple Safari, and/or Mozilla Firefox. In such embodiments, a user of client device 102 may request the previously-determined web page by entering a URL and previous-time-day into the browser application, and additionally or alternatively, by selecting a hyperlink displayed by the browser application or by an additional application configured to interface with the browser application (e.g., a word processing program configured to display actionable hyperlinks).

In an embodiment, the previous time-of-day may be specified in reference to a target geographic region that includes client device 102, and additionally or alternatively, with the user of client device 102. For example, the user may specify the target geographic region when requesting the version of the web page corresponding to the previous time of day, or in additional embodiments, web server 130 may maps the IP address of client device 102 to identify geographic region associated with the request for the web page.

For example, the geographic region corresponding to the IP address may be determined using any of a number of techniques apparent to one of skill in the art, including, but not limited to, the use of a "WhoIs" utility and the use of a commercial or proprietary lookup service. However, the mapping process is not limited to such exemplary lookup services, and in additional embodiments, web server 130 may leverage any additional or alternate technique apparent to one of skill in the art to determine a geographic region associated with the received request.

In step 1104, web server 130 subsequently determines a temporal unit associated with the previous time-of-day. As discussed above in reference to FIG. 6, the temporal unit determined in step 1104 may represent one of a plurality of discrete time buckets into which a twenty-four hour day is partitioned. For example, the temporal units may represent respective multiple-hours portions of the day, including, but not limited to morning, mid-day. afternoon, and evening. Alternatively, the day may be finely partitioned into temporal units of fifteen minutes, thirty minutes, sixty minutes, or any additional or alternate interval apparent to one of skill in the art.

In step 1106, web server 130 accesses stored page data (e.g., within page data 146 of FIG. 1) to determine whether a stored version of the requested web page is available. For example, previously-displayed versions of the requested web page may be stored in page data 146 and may be associated with corresponding times-of-day. In step 1106, web server 130 may determine whether a time-of-day of a stored version of the requested web page corresponds to the identified temporal unit.

If it is determined in step 1106 that a stored version of the requested web page is not available for the previous time-of-day, then web server 130 generates an indication of the unavailability of the requested version of the web page in step 1108. The generated indication is subsequently transmitted in step 1110 as an error message to the user of client device 102. For example, the error message may be transmitted to client device 102 across network 120 using one or more of the communications protocols outlined above. Method 1100 is then completed in step 1112.

Alternatively, if it is determined in block 1106 that a stored version of the requested web page, then web server 130 may retrieve information associated with the previously-delivered web page from page data store 146 in step 1114. In an embodiment, the retrieved information may include an HTML document or file that includes both layout information and information specifying electronic content included in the version of the requested web page delivered to client device 102 during the identified temporal unit.

In step 1116, web server 130 may subsequently transmit the retrieved HTML document corresponding to the previously-delivered version of the web page to client device 102 in step 1116. In such embodiments, the retrieved HTML document or file may be transmitted to client device 102 across network 120 using any of the number of communications protocols outlined above. Upon receipt of the HTML document or file from web server 130, the browser application of client device 102 may render the received content and display the version of the web page corresponding to the previous time-of-day to the user. In such embodiments, the exemplary processes of FIG. 11 may enable a user to rewind or replay the displayed version of the requested web page and view electronic content displayed during a prior temporal unit.

Using the exemplary techniques described herein, web server 130 may generate a customized version of a requested web page based on a current time-of-day at a location of a user and one or more preferences of that user. For example, the generated web page may include discrete categories of electronic content that are of particular interest to the user during a time period, e.g., a temporal unit, that includes the current time-of-day. However, the disclosed embodiments are not limited to such exemplary customization criteria, and in further embodiments, web server 130 may further generate the customized version of the web page based on data associated with a web site that corresponds to the requested web page.

For example, web server 130 may identify a specific type of content that is characteristic of the web site, including, but not limited to, content related to news, blog postings, and social networking. Web server 130 may subsequently obtain electronic content of the identified type that is popular within the temporal unit, and may generate the customized version of the requested web page based on the obtained electronic content.

The requested web site may also be associated with a corresponding profile or set of characteristics that include, for example, information identifying the type of content associated with the requested web site, at least one specific element of electronic content associated with the requested web page, and any additional or alternate information apparent to one of skill in the art and appropriate to the requested web page. In such an embodiment, web server 130 may obtain electronic content in accordance with the profile or set of characteristics of the requested web site, and may generate the customized version of the requested web page based on the obtained electronic content.

In the embodiments described herein, reference is made to client device 102, web server 130, and database 140. However, one of skill in the art will realize that the reference to client device 102, web server 130, and database 140 are for explanatory purposes only, and in additional embodiments, the exemplary techniques described above may be practiced using any additional or alternate client device (e.g., client device 112 of FIG. 1), web server, or database apparent to one of skill in the art and capable of communications protocol processing within network 120.

In the embodiments described herein, a web server receives a request from a client device for a particular web page, and subsequently interacts with a stored popularity and user profile data to generate a version of the requested web page that is customized to reflect a current time-of-day associated with the request and one or more user preferences. A browser application executing at the client device may render the received electronic content and display the customized version of requested web page to the user.

For example, the web server may be associated with an online retailer, search engine, or content provider that services requests for electronic content from users over a wide geographic area. In such embodiments, the web server may interact with users of client devices to deliver responses to search requests and/or deliver digital music, digital and/or streaming video, electronic books, and any additional or alternate electronic content in response to requests submitted through a web page accessible to the client device. The web server may also be associated with a search engine or module configured to receive and service search queries from client devices over a wide geographic area. In such embodiments, the web server may receive a query from the user of the client device, and may identify or provide electronic content to the client device that is associated with the received query, and that has been recently requested or delivered to similar users within the user's geographical area.

Further, for example, the customized version of requested web page may include one or more electronic advertisements that are selected by the web server based on the current time-of-day associated with the request and the one or more user preferences. In such an embodiment, the web server may identify and provide to the user electronic advertisements that are popular with similar users within the user's geographic region, or alternatively, that are globally popular with the users of the web server across all relevant geographic regions. For example, the popularity of an electronic advertisement may be determined by the web server on the basis of a number of times that users have viewed the electronic advertisement (i.e., a number of "views"), a number of times that users have accessed content associated with the electronic advertisement (e.g., a number of "clicks"), or any additional or alternate metric of popularity apparent to one of skill in the art and appropriate to the electronic advertisement.

The web server may additionally identify and provide to the user electronic advertisements that correspond to the viewing habits of the user. For example, the web server may identify the electronic advertisements based on one or more user preferences associated with corresponding user profile data (e.g., records stored in user profile data 142 of FIG. 1, or provided by a HTTP cookie). However, as described above, the identification of electronic advertisements is not limited to the use of user profile data, and in additional embodiments, the web server may identify the electronic advertisements based on a browsing history of the user, based on a browsing history of users that are demographically similar to the user or that share interests with the user, or through any additional or alternate technique apparent to one of skill in the art and appropriate to the electronic advertisement.

For example, the web server may identify a user preference associated with hiking and off-road activities during a particular time period, for example, by accessing profile data corresponding to the user, or alternatively, through an analysis of the browsing habits of the user. In response to the identified user preference, the web server may identify and provide to the user advertisements for off-road vehicles and discounts and/or coupons for the purchase of off-road equipment. Through such exemplary techniques, the web server may identify and provide to the user electronic advertisements that better correspond to the interests and needs of the user.

Various embodiments have been described herein with reference to the accompanying drawings. It will, however, be evident that various modifications and changes may be made thereto, and additional embodiments may be implemented, without departing from the scope of the invention as set forth in the claims that follow.

Further, other embodiments will be apparent to those skilled in the art from consideration of the specification and practice of one or more embodiments of the disclosed herein. It is intended, therefore, that this disclosure and the embodiments herein be considered as exemplary only, with a true scope and spirit of the invention being indicated by the following listing of exemplary claims.

What is claimed is:

1. A computer-implemented method for delivering content to users, comprising the following operations performed by one or more processors:
   receiving a request for a web page from a client device, the request comprising an identifier of the client device;
   determining a first geographic region associated with the received request, based on at least the identifier of the client device;
   generating a version of the requested web page corresponding to a current time associated with the first geographic region; and
   transmitting the generated version of the requested web page to the client device, wherein determining the first geographic region comprises:
      identifying a candidate geographic region associated with the identifier of the client device;
      obtaining a geographic preference of a user of the client device based on at least one of popularity data stored in a database or user response data stored in the database, the geographic preference identifying a second geographic region associated with the user, the popularity data including popularity, based on geographic region, of electronic content accessed by the user, and the user response data including an entry of the user in response to a request for a preferred geographic region;
      determining whether a displacement between the candidate geographic region and the second geographic region identified by the user's geographic preference obtained based on the at least one of the popularity data stored in the database or user response data stored in the database, falls within a predetermined threshold value; and
      establishing the candidate geographic region as the first geographic region associated with the received request, when the displacement falls within the predetermined threshold value,
   wherein obtaining the geographic preference of the user comprises:
      obtaining popularity data associated with a user identifier corresponding to the user, the popularity data identifying popularity of electronic content accessed by the user or the client device;
      processing the popularity data to identify one or more geographic identifiers associated with the popularity data; and
      identifying the geographic preference of the user based on the one or more geographic identifiers.

2. The method of claim 1, further comprising:
   determining a current time associated with the first geographic region based on at least one of the identifier of the client device or a geo-spatial identifier of the first geographic region associated with the received request.

3. The method of claim 1, wherein the identifier of the client device comprises an IP address of the client device.

4. The method of claim 1, wherein determining the first geographic region further comprises:
   determining whether the candidate geographic region corresponds to the second geographic region; and
   establishing the candidate geographic region as the first geographic region, when the candidate geographic region corresponds to the second geographic region.

5. The method of claim 4, wherein determining the first geographic region further comprises:
   establishing the second geographic region as the first geographic region associated with the received request, when the candidate geographic region fails to correspond to the second geographic region.

6. The method of claim 1, wherein the generating comprises:
assigning a temporal unit to the received request, the temporal unit corresponding to a portion of a day that includes the current time;
retrieving layout information corresponding to the temporal unit, the layout information comprising at least one class of electronic content;
selecting elements of electronic content that correspond to the at least one class of electronic content; and
generating the version of the requested web page, based on at least the layout information and the selected electronic content.

7. The method of claim 6, further comprising:
identifying, based on the received request, at least one content preference of a user of the client device; and
filtering the at least one class of electronic content based on the content preference of the user.

8. The method of claim 6, further comprising generating the layout information for the requested web page.

9. The method of claim 6, further comprising:
identifying popularity data associated with the temporal unit;
selecting a subset of the identified popularity data, the selected subset being associated with a user of the client device;
identifying the at least one class of electronic content from within the selected subset;
receiving editorial information associated with the layout of the requested web page, the editorial information comprising a spatial position of the at least one class of electronic content; and
generating the layout information for the requested web page, based on at least the received editorial information.

10. The method of claim 1, further comprising:
storing, in a database, information associated with the generated version of the requested web page and an indication of the current time.

11. The method of claim 10, further comprising:
receiving a request for a previously-delivered version of a web page from the client device, the request comprising an indication of a time associated with the previously-delivered version;
determining, based on the indication, whether information associated with the previously-delivered version of the web page is stored in the database;
retrieving the information associated with the previously-delivered version of the web page, when the information is stored in the database; and
transmitting the previously-delivered version of the web page to the client device in response to the request.

12. The method of claim 1, wherein determining the first geographic region associated with the received request further comprises:
obtaining geo-spatial identifiers associated with the candidate geographic region and the second geographic region;
determining, using the geo-spatial identifiers, whether a relationship between the candidate geographic region and the second geographic region corresponds to a predetermined relationship; and
establishing the candidate geographic region as the first geographic region associated with the received request, when the identified relationship corresponds to the predetermined relationship.

13. The method of claim 1, wherein determining the first geographic region further comprises:
obtaining geo-spatial coordinates associated with the candidate geographic region and the second geographic region; and
computing the displacement between the portion of the candidate geographic region and the portion of the second geographic region based on the geo-spatial coordinates.

14. An apparatus, comprising:
a storage device; and
at least one processor coupled to the storage device, wherein the storage device stores a program for controlling the at least one processor, and wherein the at least one processor, being operative with the program, is configured to:
receive a request for a web page from a client device, the request comprising an identifier of the client device;
determine a first geographic region associated with the received request, based on at least the identifier of the client device;
generate a version of the requested web page that corresponds to a current time associated with the first geographic region; and
deliver the generated version of the requested web page to the client device,
the at least one processor being further configured to:
identify a candidate geographic region associated with the identifier of the client device;
obtain a geographic preference of a user of the client device based on at least one of popularity data stored in a database or user response data stored in the database, the geographic preference identifying a second geographic region associated with the user, the popularity data including popularity, based on geographic region, of electronic content accessed by the user, and the user response data including an entry of the user in response to a request for a preferred geographic region;
determine whether a displacement between the candidate geographic region and the second geographic region identified by the user's geographic preference obtained based on the at least one of the popularity data stored in the database or user response data stored in the database, falls within a predetermined threshold value; and
establish the candidate geographic region as the geographic region associated with the received request, when the displacement falls within the predetermined threshold value,
wherein, when obtaining the geographic preference of the user, the processor is configured to:
obtain popularity data associated with a user identifier corresponding to the user, the popularity data identifying popularity of electronic content accessed by the user or the client device;
process the popularity data to identify one or more geographic identifiers associated with the popularity data; and
identify the geographic preference of the user based on the one or more geographic identifiers.

15. The apparatus of claim 14, wherein the processor is further configured to determine a current time associated with the first geographic region, based on at least one of the identifier of the client device or a geo-spatial identifier of the first geographic region.

16. The apparatus of claim 14, wherein the identifier of the client device comprises an IP address of the client device.

17. The apparatus of claim 14, wherein the processor is further configured to:
   determine whether the candidate geographic region corresponds to the second geographic region; and
   establish the candidate geographic region as the first geographic region, when the candidate geographic region corresponds to the second geographic region.

18. The apparatus of claim 17, wherein the processor is further configured to:
   establish the second geographic region as the first geographic region associated with the received request, when the candidate geographic region fails to correspond to the second geographic region.

19. The apparatus of claim 14, wherein the processor configured to generate comprises:
   assign a temporal unit to the received request, the temporal unit corresponding to a portion of a day that includes the current time;
   retrieve layout information corresponding to the temporal unit, the layout information comprising at least one class of electronic content;
   select elements of electronic content that correspond to the at least one class of electronic content; and
   generate the version of the requested web page, based on at least the layout information and the selected electronic content.

20. The apparatus of claim 19, wherein the processor is further configured to:
   identify, based on the received request, at least one content preference of a user of the client device; and
   filter the at least one class of electronic content based on the content preference of the user.

21. The apparatus of claim 19, wherein the processor is further configured to generate the layout information for the requested web page.

22. The apparatus of claim 19, wherein the processor is further configured to:
   identify popularity data associated with the temporal unit;
   select a subset of the identified popularity data, the selected subset being associated with a user of the client device;
   identifying the at least one class of electronic content from within the selected subset;
   receiving editorial information associated with the layout of the requested web page, the editorial information comprising a spatial position of the at least one class of electronic content; and
   generate the layout information for the requested web page, based on at least the received editorial information.

23. The apparatus of claim 14, wherein the processor is further configured to:
   store, in a database, information associated with the generated version of the requested web page and an indication of the current time.

24. The method of claim 23, wherein the processor is further configured to:
   receive a request for a previously-delivered version of a web page from the client device, the request comprising an indication of a time associated with the previously-delivered version;
   determine, based on the indication, whether information associated with the previously-delivered version of the web page is stored in the database;
   retrieve the information associated with the previously-delivered version of the web page, when the information is stored in the database; and
   transmit the previously-delivered version of the web page to the client device in response to the request.

25. A tangible, non-transitory computer-readable medium storing instructions that, when executed by at least one processor, perform a method for delivering content to users, the method comprising the steps of:
   receiving a request for a web page from a client device, the request comprising an identifier of the client device;
   determining a first geographic region associated with the received request, based on at least the identifier of the client device;
   generating a version of the requested web page corresponding to a current time associated with the first geographic region; and
   transmitting the generated version of the requested web page to the client device, wherein determining the first geographic region comprises:
      identifying a candidate geographic region associated with the identifier of the client device;
      obtaining a geographic preference of a user of the client device based on at least one of popularity data stored in a database or user response data stored in the database, the geographic preference identifying a second geographic region associated with the user, the popularity data including popularity, based on geographic region, of electronic content accessed by the user, and the user response data including an entry of the user in response to a request for a preferred geographic region;
      determining whether a displacement between the candidate geographic region and the second geographic region identified by the user's geographic preference obtained based on the at least one of the popularity data stored in the database or user response data stored in the database, falls within a predetermined threshold value; and
      establishing the candidate geographic region as the geographic region associated with the received request, when the displacement falls within the predetermined threshold value,
   wherein obtaining the geographic preference of the user comprises:
      obtaining popularity data associated with a user identifier corresponding to the user, the popularity data identifying popularity of electronic content accessed by the user or the client device;
      processing the popularity data to identify one or more geographic identifiers associated with the popularity data; and
      identifying the geographic preference of the user based on the one or more geographic identifiers.

* * * * *